US009482845B2

(12) United States Patent
Tang et al.

(10) Patent No.: US 9,482,845 B2
(45) Date of Patent: Nov. 1, 2016

(54) OPTICAL IMAGE CAPTURING SYSTEM

(71) Applicant: ABILITY OPTO-ELECTRONICS TECHNOLOGY CO.LTD., Taichung (TW)

(72) Inventors: Nai-Yuan Tang, Taichung (TW); Yeong-Ming Chang, Taichung (TW)

(73) Assignee: ABILITY OPTO-ELECTRONICS TECHNOLOGY CO.LTD., Taichung (TW)

( * ) Notice: Subject to any disclaimer, the term of this patent is extended or adjusted under 35 U.S.C. 154(b) by 35 days.

(21) Appl. No.: 14/584,719

(22) Filed: Dec. 29, 2014

(65) Prior Publication Data

US 2016/0124186 A1    May 5, 2016

(30) Foreign Application Priority Data

Nov. 4, 2014  (TW) .............................. 103138261 A

(51) Int. Cl.
| | |
|---|---|
| *G02B 3/02* | (2006.01) |
| *G02B 13/18* | (2006.01) |
| *G02B 13/00* | (2006.01) |

(52) U.S. Cl.
CPC ................................ *G02B 13/0045* (2013.01)

(58) Field of Classification Search
CPC ......... G02B 13/18; G02B 3/04; G02B 13/04
USPC .................................................. 359/708, 713
See application file for complete search history.

(56) References Cited

U.S. PATENT DOCUMENTS 8,477,431 B2 *  7/2013  Huang .......................... 359/713

FOREIGN PATENT DOCUMENTS

TW            201439582 A    10/2014

\* cited by examiner

*Primary Examiner* — James Greece
(74) *Attorney, Agent, or Firm* — Muncy, Geissler, Olds & Lowe, P.C.

(57) ABSTRACT

An optical image capturing system, from an object side to an image side, comprises a first, second, third, fourth, fifth, and sixth lens elements. The first lens element with refractive power has a convex object-side surface. The second through fifth lens elements have refractive power and both of an object-side surface and an image-side surface of the four lens elements are aspheric. The sixth lens with negative refractive power has a concave object-side surface. Both of the image-side and object-side surfaces of the six lens elements are aspheric and at least one of the two surfaces has inflection points. Each of the six lens elements may have refractive power. When specific conditions are satisfied, the optical image capturing system can have a better optical path adjusting ability to acquire better imaging quality.

24 Claims, 24 Drawing Sheets

OPTICAL IMAGE CAPTURING SYSTEM

CROSS-REFERENCE TO RELATED APPLICATION

This application claims the benefit of Taiwan Patent Application No. 103138261, filed on Nov. 4, 2014, in the Taiwan Intellectual Property Office, the disclosure of which is incorporated herein in its entirety by reference.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system towards the field of high pixels. Therefore, the requirement for high imaging quality is rapidly raised.

The traditional optical image capturing system of a portable electronic device comes with different designs, including a four-lens or a five-lens design. However, the requirement for the higher pixels quality and the requirement for a wide angle of an end user, like self-shooting function of a preset lens are raised. The optical image capturing system in prior arts cannot meet the requirement of the higher order camera lens module.

Therefore, how to effectively increase the view angle of the optical lenses and further improve image quality for the image formation becomes a quite important issue.

SUMMARY OF THE INVENTION

The aspect of embodiment of the present disclosure directs to an optical image capturing system and an optical image capturing lens which use combination of refractive powers, convex and concave surfaces of six-piece optical lenses (the convex or concave surface in the disclosure denotes the geometrical shape of an image-side surface or an object-side surface of each lens element on an optical axis) to further increase view angle of the optical image capturing system, and to improve imaging quality for image formation, so as to be applied to minimized electronic products.

The term and its definition to the lens element parameter in the embodiment of the present are shown as below for further reference.

The lens element parameter related to a length or a height in the lens element

A height for image formation of the optical image capturing system is denoted by HOI. A height of the optical image capturing system is denoted by HOS. A distance from the object-side surface of the first lens element to the image-side surface of the sixth lens element is denoted by InTL. A distance from an aperture stop (aperture) to an image plane is denoted by InS. A distance from the first lens element to the second lens element is denoted by In12 (instance). A central thickness of the first lens element of the optical image capturing system on the optical axis is denoted by TP1 (instance).

The Lens Element Parameter Related to a Material in the Lens Element

An Abbe number of the first lens element in the optical image capturing system is denoted by NA1 (instance). A refractive index of the first lens element is denoted by Nd1 (instance).

The Lens Element Parameter Related to a View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP.

The Lens Element Parameter Related to a Depth of the Lens Element Shape

A distance in parallel with the optical axis from a maximum effective diameter position to an axial point on the object-side surface of the sixth lens element is denoted by InRS61 (depth of maximum effective diameter). A distance in parallel with an optical axis from a maximum effective diameter position to an axial point on the image-side surface of the sixth lens element is denoted by InRS62 (depth of maximum effective diameter). The representation of the depth of maximum effective diameter (sinkage value) on the object-side surface or the image-side surface of others lens elements is the same as the aforementioned description.

The Lens Element Parameter Related to the Lens Element Shape

A critical point C is a tangent point on a surface of a specific lens element, and the tangent point is tangent to a plane perpendicular to the optical axis and the tangent point cannot be a crossover point on the optical axis. To follow the past, a distance perpendicular to the optical axis between a critical point C51 on the object-side surface of the fifth lens element and the optical axis is HVT51 (instance). A distance perpendicular to the optical axis between a critical point C52 on the image-side surface of the fifth lens element and the optical axis is HVT52 (instance). A distance perpendicular to the optical axis between a critical point C61 on the object-side surface of the sixth lens element and the optical axis is HVT61 (instance). A distance perpendicular to the optical axis between a critical point C62 on the image-side surface of the sixth lens element and the optical axis is HVT62 (instance). The representation of a distance perpendicular to the optical axis between a critical point on the image-side surface or the object-side surface of others lens elements and the optical axis is the same as the aforementioned description.

The object-side surface of the sixth lens element has one inflection point IF611 which is nearest to the optical axis, and the sinkage value of the inflection point IF611 is denoted by SGI611 (instance). That is, SGI611 is a distance in parallel with the optical axis from the inflection point IF611 nearest to the optical axis to an axial point on the object-side surface of the sixth lens element. A distance perpendicular to the optical axis between the inflection point IF611 and the optical axis is HIF611 (instance). The image-side surface of the sixth lens element has one inflection point IF621 which is nearest to the optical axis and the sinkage value of the inflection point IF621 is denoted by SGI621 (instance). That is, SGI621 is a distance in parallel with an optical axis from the inflection point IF621 on the image-side surface of the sixth lens element is nearest to the optical axis to an axial point on the image-side surface of the sixth lens element. A distance perpendicular to the optical axis between the inflection point IF621 and the optical axis is HIF621 (instance).

The object-side surface of the sixth lens element has one inflection point IF612 which is the second point away from the optical axis and the sinkage value of the inflection point IF612 is denoted by SGI612 (instance). That is, SGI612 is a distance in parallel with an optical axis from the inflection point IF612 on the object-side surface of the sixth lens element is the second point away from the optical axis to an axial point on the object-side surface of the sixth lens element. A distance perpendicular to the optical axis between the inflection point IF612 and the optical axis is HIF612 (instance). The image-side surface of the sixth lens element has one inflection point IF622 which is the second point away from the optical axis and the sinkage value of the inflection point IF622 is denoted by SGI622 (instance). That is, SGI622 is a distance in parallel with an optical axis from the inflection point IF622 on the image-side surface of the sixth lens element is the second point away from the optical axis to an axial point on the image-side surface of the sixth lens element. A distance perpendicular to the optical axis between the inflection point IF622 and the optical axis is HIF622 (instance).

The object-side surface of the sixth lens element has one inflection point IF613 which is the third point away from the optical axis and the sinkage value of the inflection point IF613 is denoted by SGI613 (instance). That is, SGI613 is a distance in parallel with an optical axis from the inflection point IF613 on the object-side surface of the sixth lens element is the third point away from the optical axis to an axial point on the object-side surface of the sixth lens element. A distance perpendicular to the optical axis between the inflection point IF613 and the optical axis is HIF613 (instance). The image-side surface of the sixth lens element has one inflection point IF623 which is the third point away from the optical axis and the sinkage value of the inflection point IF623 is denoted by SGI623 (instance). That is, SGI623 is a distance in parallel with an optical axis from the inflection point IF623 on the image-side surface of the sixth lens element is the third point away from the optical axis to an axial point on the image-side surface of the sixth lens element. A distance perpendicular to the optical axis between the inflection point IF623 and the optical axis is HIF623 (instance).

The representation of a distance perpendicular to the optical axis between the inflection point on the image-side surface or the object-side surface of others lens elements and the optical axis is the same as the aforementioned description.

The Lens Element Parameter Related to an Aberration

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

The disclosure provides an optical image capturing system, an object-side surface or an image-side surface of the sixth lens element has inflection points, such that the angle of incidence from each view field to the sixth lens element can be adjusted effectively and the optical distortion and the TV distortion can be corrected as well. Besides, the surfaces of the sixth lens element may have a better optical path adjusting ability to acquire better imaging quality.

The disclosure provides an optical image capturing system, in order from an object side to an image side, including a first, second, third, fourth, fifth, and sixth lens elements. The first lens element has refractive power. An object-side surface and an image-side surface of the sixth lens element are aspheric. Focal lengths of the first through sixth lens elements are f1, f2, f3, f4, f5, and f6, respectively. A focal length of the optical image capturing system is f. An entrance pupil diameter of the optical image capturing system is HEP. Half of a maximal view angle of the optical image capturing system is HAF. A distance from an object-side surface of the first lens element to the image plane is HOS. The following relation is satisfied: $1.4 \leq f/HEP \leq 6.0$ and $0.5 \leq HOS/f \leq 3.0$.

The disclosure provides another optical image capturing system, in order from an object side to an image side, including a first, second, third, fourth, fifth, and sixth lens elements. The first lens element with positive refractive power has a convex object-side surface adjacent to the optical axis, and an image-side surface and the object-side surface of the first lens element are aspheric. The second lens element has refractive power. The third lens element has refractive power. The fourth lens element has refractive power. The fifth lens element with refractive power. The sixth lens element has negative refractive power, and an object-side surface and an image-side surface of the sixth lens element are aspheric. Focal lengths of the first through sixth lens elements are f1, f2, f3, f4, f5, and f6, respectively. A focal length of the optical image capturing system is f. An entrance pupil diameter of the optical image capturing system is HEP. Half of a maximal view angle of the optical image capturing system is HAF. A distance from an object-side surface of the first lens element to the image plane is HOS. TV distortion and optical distortion for image formation in the optical image capturing system is TDT and ODT, respectively. The following relation is satisfied: $1.4 \leq f/HEP \leq 6.0$, $0.4 \leq |\tan(HAF)| \leq 3.0$, $0.5 \leq HOS/f \leq 3.0$, $|TDT| \leq 60\%$, and $|ODT| \leq 50\%$.

The disclosure provides another optical image capturing system, in order from an object side to an image side, including a first, second, third, fourth, fifth, and sixth lens elements. At least two lens elements among the six lens elements respectively have at least one inflection point on at least one surface thereof. The first lens element has positive refractive power, and an object-side surface and an image-side surface of the first lens element are aspheric. The second lens element has refractive power. The third lens element has refractive power. The fourth lens element has refractive power. The fifth lens element with positive refractive power. The sixth lens element has negative refractive power, and an object-side surface and an image-side surface of the sixth lens element are aspheric. Focal lengths of the first through sixth lens elements are f1, f2, f3, f4, f5, and f6, respectively. A focal length of the optical image capturing system is f. An entrance pupil diameter of the optical image capturing system is HEP. Half of a maximal view angle of the optical image capturing system is HAF. A distance from an object-side surface of the first lens element to the image plane is HOS. TV distortion and optical distortion for image formation in the optical image capturing system is TDT and ODT, respectively. The following relation is satisfied: $1.2 \leq f/HEP \leq 6.0$, $0.4 \leq |\tan(HAF)| \leq 3.0$, $0.5 \leq HOS/f \leq 3.0$, $|TDT| < 1.5\%$, and $|ODT| \leq 2.5\%$.

The height of optical system (HOS) can be reduced to achieve the minimization of the optical image capturing system when f1 is larger than f6 (f1>f6).

When |f2|+|f3|+|f4|+|f5| and |f1|+|f6| is satisfied with above relations, at least one of the second through fifth lens elements may have weak positive refractive power or weak negative refractive power. The weak refractive power indicates that an absolute value of the focal length of a specific lens element is greater than 10. When at least one of the second through fifth lens elements has the weak positive refractive power, the positive refractive power of the first lens element can be shared, such that the unnecessary aberration will not appear too early. On the contrary, when at least one of the second through fifth lens elements has the weak negative refractive power, the aberration of the optical image capturing system can be corrected and fine tuned.

The sixth lens element with negative refractive power may have a concave image-side surface. Hereby, the back focal length is reduced for keeping the miniaturization, to miniaturize the lens element effectively. In addition, at least one on the object-side surface and the image-side surface of the sixth lens element may have at least one inflection point, such that the angle of incident with incoming light from an off-axis view field can be suppressed effectively and the aberration in the off-axis view field can be corrected further.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
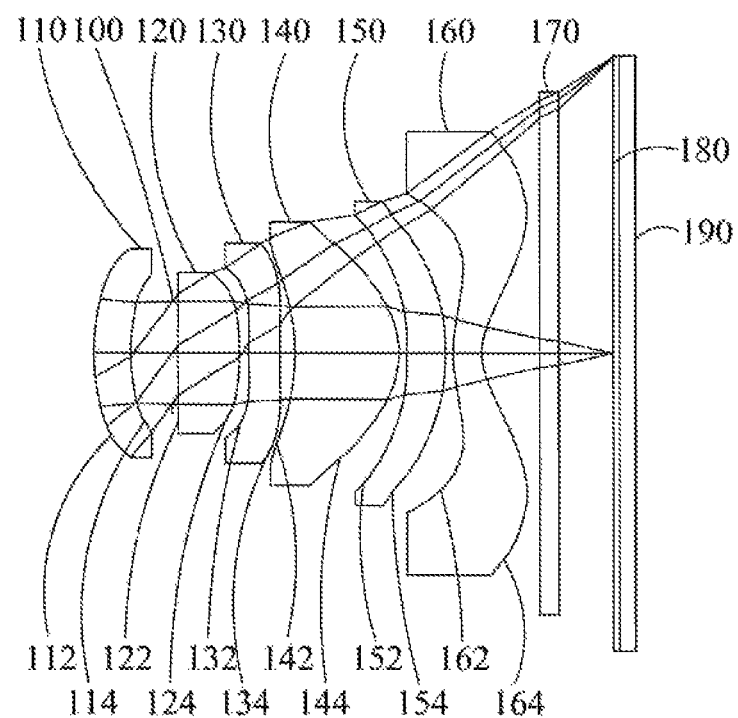
FIG. 1A is a schematic view of the optical image capturing system according to the first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in order from an object side to an image side, includes a first, second, third, fourth, fifth, and sixth lens elements with refractive power. The optical image capturing system may further include an image sensing device which is disposed on an image plane.

The optical image capturing system is to use three sets of wavelengths which are 486.1 nm, 587.5 nm and 656.2 nm, respectively, wherein 587.5 nm is served as the primary reference wavelength and 555 nm is served as the reference wavelength of primary capturing technical features.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR. A sum of the NPR of all lens elements with negative refractive powers is ΣNPR. It is beneficial to control the total refractive power and the total length of the optical image capturing system when following conditions are satisfied: $0.5 \leq \Sigma PPR/|\Sigma NPR| \leq 2.5$. Preferably, the following relation may be satisfied: $1 \leq \Sigma PPR/|\Sigma NPR| \leq 2.0$.

A sum of a focal length fp of each lens element with positive refractive power is ΣPP. A sum of a focal length of each lens element with negative refractive power is ΣNP. In one embodiment of the optical image capturing system of the present disclosure, the first lens, fourth lens and fifth lens elements may have positive refractive power. A focal length of the first lens element is f1, a focal length of the fourth lens element is f4 and a focal length of the fifth lens element is f5. The following relation is satisfied: $\Sigma PP = f1+f4+f5$, $0 < \Sigma PP \leq 5$ and $f1/\Sigma PP \leq 0.85$. Preferably, the following relation may be satisfied: $0 < \Sigma PP \leq 4.0$ and $0.01 \leq f1/\Sigma PP \leq 0.5$. Hereby, it's beneficial to control the focus ability of the optical image capturing system and allocate the positive refractive power of the optical image capturing system appropriately, so as to suppress the significant aberration generating too early. The second lens, third lens and sixth lens elements may have negative refractive power. A focal length of the second lens element is f2, a focal length of the third lens element is f3 and a focal length of the sixth lens element is f6. The following relation is satisfied: $\Sigma NP = f2+f3+f6$, $\Sigma NP < 0$ and $f6/\Sigma NP \leq 0.85$. Preferably, the following relation may be satisfied: $\Sigma NP < 0$ and $0.01 \leq f6/\Sigma NP \leq 0.5$. It is beneficial to control the total refractive power and the total length of the optical image capturing system.

The first lens element may have positive refractive power, and it has a convex object-side surface and may have a concave image-side surface. Hereby, strength of the positive refractive power of the first lens element can be fined-tuned, so as to shorten the total length of the optical image capturing system.

The second lens element may have negative refractive power, and it may have a convex object-side surface and a concave image-side surface. Hereby, the aberration generated by the first lens element can be corrected.

The third lens element may have positive refractive power and a convex image-side surface. Hereby, the positive refractive power of the first lens element can be shared, so as to avoid longitudinal spherical aberration to increase excessively and to decrease the sensitivity of the optical image capturing system.

The fourth lens element may have negative refractive power, a concave object-side surface and a convex image-side surface. Hereby, the astigmatic can be corrected, such that the image surface will become smoother.

The fifth lens element may have positive refractive power and it can share the positive refractive power of the first lens element, and the spherical aberration can be improved by adjusting the angle of incidence from each view field to the fifth lens element effectively.

The sixth lens element may have negative refractive power and a concave image-side surface. Hereby, the back focal length is reduced for keeping the miniaturization, so as to miniaturize the lens element effectively. In addition, at least one on the object-side surface and the image-side surface of the sixth lens element may have at least one inflection point, such that the angle of incident with incoming light from an off-axis view field can be suppressed effectively and the aberration in the off-axis view field can be corrected further. Preferably, each of the object-side surface and the image-side surface may have at least one inflection point.

The optical image capturing system may further include an image sensing device which is disposed on an image plane. Half of a diagonal of an effective detection field of the image sensing device (imaging height or the maximum image height of the optical image capturing system) is HOI. A distance on the optical axis from the object-side surface of the first lens element to the image plane is HOS. The following relation is satisfied: $HOS/HOI \leq 3$ and $0.5 \leq HOS/f \leq 2.5$. Preferably, the following relation may be satisfied: $1 \leq HOS/HOI \leq 2.5$ and $1 \leq HOS/f \leq 2$. Hereby, the miniaturization of the optical image capturing system can be maintained effectively, so as to be carried by lightweight portable electronic devices.

In addition, in the optical image capturing system of the disclosure, according to different requirements, at least one aperture stops may be arranged for reducing stray light and improving the image quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the effect of receiving images of the image sensing device can be raised. If the aperture stop is the middle aperture, the view angle of the optical image capturing system can be expended, such that the optical image capturing system has the same advantage that is owned by wide angle cameras. A distance from the aperture stop to the image plane is InS. The following relation is satisfied: $0.6 \leq InS/HOS \leq 1.1$. Preferably, the following relation may be satisfied: $0.8 \leq InS/HOS \leq 1$. Hereby, features of maintaining the minimization for the optical image capturing system and having wide-angle are available simultaneously.

In the optical image capturing system of the disclosure, a distance from the object-side surface of the first lens element to the image-side surface of the sixth lens element is InTL. A total central thickness of all lens elements with refractive power on the optical axis is ΣTP. The following relation is satisfied: 0.45≤TP/InTL≤0.95. Hereby, contrast ratio for the image formation in the optical image capturing system and defect-free rate for manufacturing the lens element can be given consideration simultaneously, and a proper back focal length is provided to dispose others optical components in the optical image capturing system.

A curvature radius on the object-side surface of the first lens element is R1. A curvature radius on the image-side surface of the first lens element is R2. The following relation is satisfied: 0.1≤|R1/R2|≤5. Hereby, the first lens element may have proper strength of the positive refractive power, so as to avoid the longitudinal spherical aberration to increase too fast. Preferably, the following relation may be satisfied: 0.2≤|R1/R2|≤2.

A curvature radius on the object-side surface of the sixth lens element is R11. A curvature radius on the image-side surface of the sixth lens element is R12. The following relation is satisfied: −10<(R11−R12)/(R11+R12)<30. Hereby, the astigmatic generated by the optical image capturing system can be corrected beneficially.

A distance between the first lens element and the second lens element on the optical axis is IN12. The following relation is satisfied: 0<IN12/f≤0.25. Preferably, the following relation may be satisfied: 0.01≤IN12/f≤0.20. Hereby, the chromatic aberration of the lens elements can be improved, such that the performance can be increased.

Central thicknesses of the first lens element and the second lens element on the optical axis are TP1 and TP2, respectively. The following relation is satisfied: 1≤(TP1+IN12)/TP2≤10. Hereby, the sensitivity produced by the optical image capturing system can be controlled, and the performance can be increased.

Central thicknesses of the fifth lens element and the sixth lens element on the optical axis are TP5 and TP6, respectively, and a distance between the fifth lens element and the sixth lens element on the optical axis is IN56. The following relation is satisfied: 0.2≤(TP6+IN56)/TP5≤3. Hereby, the sensitivity produced by the optical image capturing system can be controlled and the total height of the optical image capturing system can be reduced.

Central thicknesses of the third lens element, the fourth lens element, and the fifth lens element on the optical axis are TP3, TP4, and TP5, respectively. A distance between the third lens element and the fourth lens element on the optical axis is IN34. A distance between the fourth lens element and the fifth lens element on the optical axis is IN45. A distance from the object-side surface of the first lens element to the image-side surface of the sixth lens element is InTL. The following relation is satisfied: 0.1≤(TP3+TP4+TP5)/ΣTP≤0.8. Preferably, the following relation may be satisfied: 0.4≤(TP3+TP4+TP5)/ΣTP≤0.8. Hereby, the aberration generated by the process of moving the incident light can be adjusted slightly layer upon layer, and the total height of the optical image capturing system can be reduced.

A distance in parallel with an optical axis from a maximum effective diameter position to an axial point on the object-side surface of the sixth lens element is InRS61 (the InRS61 is positive if the horizontal displacement is toward the image-side surface, or the InRS61 is negative if the horizontal displacement is toward the object-side surface). A distance in parallel with an optical axis from a maximum effective diameter position to an axial point on the image-side surface of the sixth lens element is InRS62. A central thickness of the sixth lens element on the optical axis is TP6. The following relation is satisfied: −2 mm≤InRS61≤2 mm, −5 mm≤InRS62≤5 mm, 0 mm≤|InRS61|+|InRS62|≤7 mm, 0<|InRS61|/TP6≤5 and 0<|InRS62|/TP6≤10. Hereby, it's favorable for manufacturing and forming the lens element and for maintaining the minimization for the optical image capturing system. Preferably, the following relation may be satisfied: 0.001 mm≤|InRS61|+||InRS62|≤3.5 mm. Hereby, the maximum effective diameter position between adjacent surfaces of the sixth lens element can be controlled, so as to correct the aberration of surrounding view field and to maintain the minimization for the optical image capturing system.

In the optical image capturing system of the disclosure, a distance perpendicular to the optical axis between a critical point C61 on the object-side surface 162 of the sixth lens element and the optical axis is HVT61. A distance perpendicular to the optical axis between a critical point C62 on the image-side surface 164 of the sixth lens element and the optical axis is HVT62. A distance in parallel with the optical axis from an axial point on the object-side surface of the sixth lens element to the critical point C62 is SGC61. A distance in parallel with the optical axis from an axial point on the image-side surface of the sixth lens element to the critical point C62 is SGC62. The following relation is satisfied: 0 mm≤HVT61≤3 mm, 0 mm<HVT62≤6 mm, 0≤HVT61/HVT62, 0 mm≤|SGC61|≤0.5 mm, 0 mm≤|SGC62|≤2 mm and 0<|SGC62|/(|SGC62|+TP6)≤0.9. Hereby, the aberration of the off-axis view field can be corrected effectively.

The following relation is satisfied for the optical image capturing system of the disclosure: 0.2≤HVT62/HOI≤0.9. Preferably, the following relation may be satisfied: 0.3≤HVT62/HOI≤0.8. Hereby, the aberration of surrounding view field for the optical image capturing system can be corrected beneficially.

The following relation is satisfied for the optical image capturing system of the disclosure: 0≤HVT62/HOS≤0.5. Preferably, the following relation may be satisfied: 0.2≤HVT62/HOS≤0.45. Hereby, the aberration of surrounding view field for the optical image capturing system can be corrected beneficially.

In the optical image capturing system of the disclosure, a distance in parallel with an optical axis from an inflection point nearest to the optical axis to an axial point on the object-side surface of the sixth lens element is denoted by SGI611. A distance in parallel with an optical axis from an inflection point nearest to the optical axis to an axial point on the image-side surface of the sixth lens element is denoted by SGI621. The following relation is satisfied: 0<SGI611/(SGI611+TP6)≤0.9 and 0<SGI621/(SGI621+TP6)≤0.9. Preferably, the following relation may be satisfied: 0.1≤SGI611/(SGI611+TP6)≤0.6 and 0.1≤SGI621/(SGI621+TP6)≤0.6.

A distance in parallel with the optical axis from the inflection point on the object-side surface of the sixth lens element is the second point away from the optical axis to an axial point on the object-side surface of the sixth lens element is denoted by SGI612. A distance in parallel with an optical axis from an inflection point on the image-side surface of the sixth lens element is the second point away from the optical axis to an axial point on the image-side surface of the sixth lens element is denoted by SGI622. The following relation is satisfied: 0<SGI612/(SGI612+

TP6)≤0.9 and 0<SGI622/(SGI622+TP6)≤0.9. Preferably, the following relation may be satisfied: 0.1≤SGI612/(SGI612+TP6)≤0.6 and 0.1≤SGI622/(SGI622+TP6)≤0.6.

A distance perpendicular to the optical axis between the inflection point on the object-side surface of the sixth lens element is nearest to the optical axis and the optical axis is denoted by HIF611. A distance perpendicular to the optical axis between an axial point on the image-side surface of the sixth lens element and an inflection point on the image-side surface of the sixth lens element is nearest to the optical axis is denoted by HIF621. The following relation is satisfied: 0.001 mm≤|HIF611|≤5 mm and 0.001 mm≤|HIF621|≤5 mm. Preferably, the following relation may be satisfied: 0.1 mm≤|HIF611|≤3.5 mm and 1.5 mm≤|HIF621|≤3.5 mm.

A distance perpendicular to the optical axis from the inflection point on the object-side surface of the sixth lens element is the second point away from the optical axis to an axial point on the object-side surface of the sixth lens element is denoted by HIF612. A distance perpendicular to the optical axis between an axial point on the image-side surface of the sixth lens element and an inflection point on the image-side surface of the sixth lens element is the second point away from the optical axis is denoted by HIF622. The following relation is satisfied: 0.001 mm≤|HIF612|≤5 mm and 0.001 mm≤|HIF622|≤5 mm. Preferably, the following relation may be satisfied: 0.1 mm≤|HIF622|≤3.5 mm and 0.1 mm≤|HIF612|≤3.5 mm.

The above Aspheric formula is: $z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots$ (1),
where z is a position value of the position along the optical axis and at the height h which reference to the surface apex; k is the conic coefficient, c is the reciprocal of curvature radius, and A4, A6, A8, A10, A12, A14, A16, A18, and A20 are high order aspheric coefficients.

The optical image capturing system provided by the disclosure, the lens elements may be made of glass or plastic material. If plastic material is adopted to produce the lens elements, the cost of manufacturing will be lowered effectively. If lens elements are made of glass, the heat effect can be controlled and the designed space arranged for the refractive power of the optical image capturing system can be increased. Besides, the object-side surface and the image-side surface of the first through sixth lens elements may be aspheric, so as to obtain more control variables. Comparing with the usage of traditional lens element made by glass, the number of using lens elements can be reduced and the aberration can be eliminated. Therefore, the total height of the optical image capturing system can be reduced effectively.

In addition, in the optical image capturing system provided of the disclosure, the lens element has a convex surface if the surface of the lens element is convex adjacent to the optical axis. The lens element has a concave surface if the surface of the lens element is concaving adjacent to the optical axis.

The optical image capturing system of the disclosure can be adapted to the optical image capturing system with automatic focus if required. With the features of a good aberration correction and a high quality of image formation, the optical image capturing system can be used in various application fields.

According to the above embodiments, the specific embodiments with figures are presented in detailed as below.

The First Embodiment (Embodiment 1)

Figure 1B:
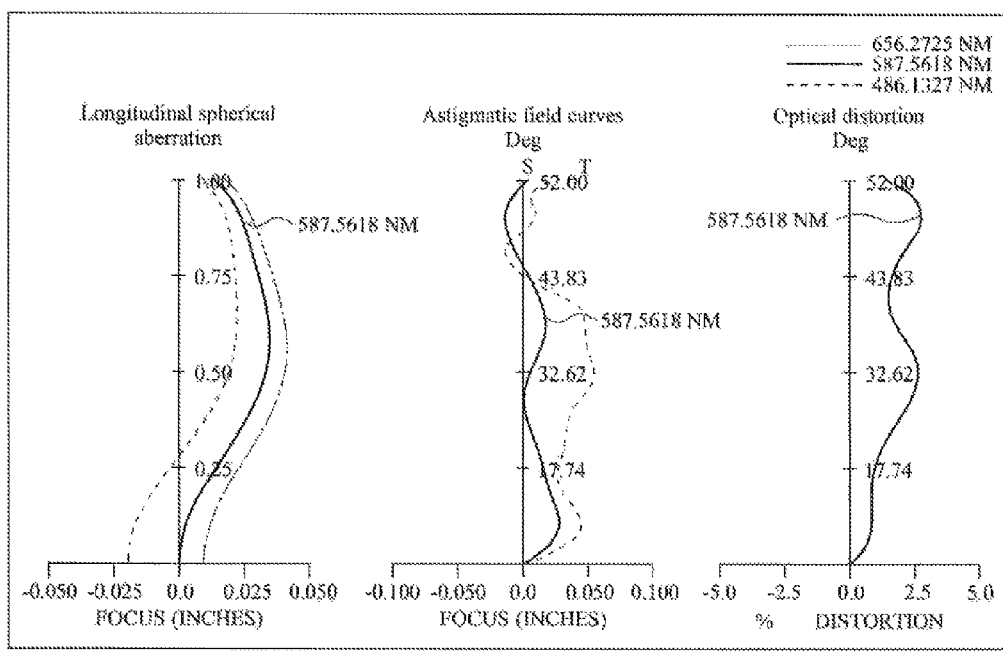
FIG. 1B is longitudinal spherical aberration curves, astigmatic field curves, and an optical distortion grid of the optical image capturing system in the order from left to right according to the first embodiment of the present application.
Figure 1C:
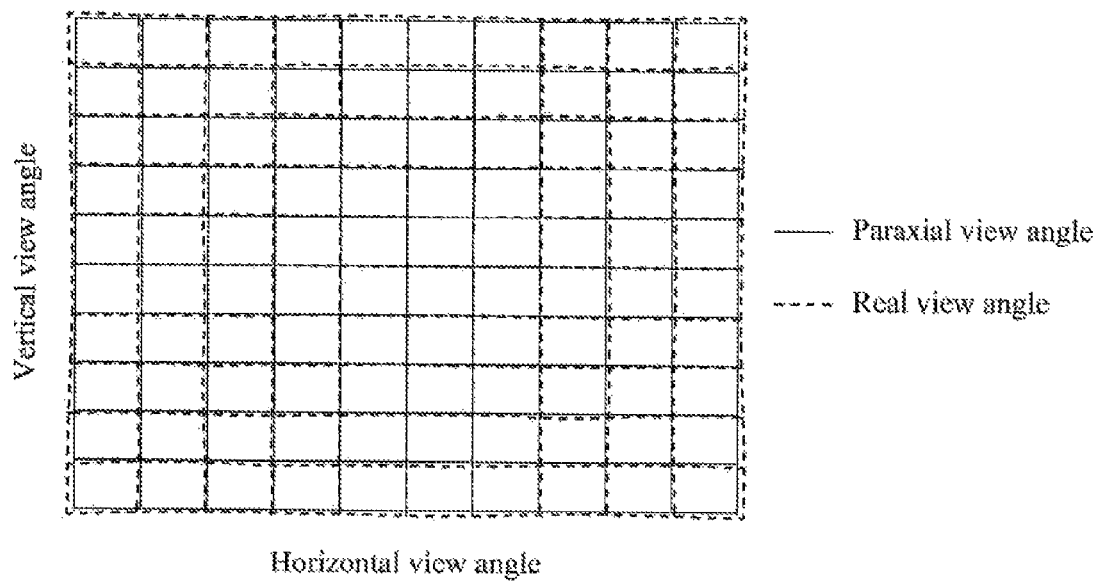
FIG. 1C is a TV distortion grid of the optical image capturing system according to the first embodiment of the present application.

Please refer to FIG. 1A, FIG. 1B, and FIG. 1C, FIG. 1A is a schematic view of the optical image capturing system according to the first embodiment of the present application, FIG. 1B is longitudinal spherical aberration curves, astigmatic field curves, and an optical distortion curve of the optical image capturing system in the order from left to right according to the first embodiment of the present application, and FIG. 1C is a TV distortion grid of the optical image capturing system according to the first embodiment of the present application. As shown in FIG. 1A, in order from an object side to an image side, the optical image capturing system includes a first lens element 110, an aperture stop 100, a second lens element 120, a third lens element 130, a fourth lens element 140, a fifth lens element 150, a sixth lens element 160, an IR-bandstop filter 170, an image plane 180, and an image sensing device 190.

The first lens element 110 has positive refractive power and it is made of plastic material. The first lens element 110 has a convex object-side surface 112 and a concave image-side surface 114, and both of the object-side surface 112 and the image-side surface 114 are aspheric.

The second lens element 120 has positive refractive power and it is made of plastic material. The second lens element 120 has a convex object-side surface 122 and a convex image-side surface 124, both of the object-side surface 122 and the image-side surface 124 are aspheric, and the object-side surface 122 has an inflection point. A distance in parallel with an optical axis from an inflection point nearest to the optical axis to an axial point on the object-side surface of the second lens element is denoted by SGI211. The following relation is satisfied: SGI211=0.00587064 mm, TP2=0.639748 mm and |SGI211|/(|SGI211|+TP2)=0.015368705.

A distance perpendicular to the optical axis between the inflection point on the object-side surface of the second lens element is nearest to the optical axis and the optical axis is denoted by HIF211. The following relation is satisfied: HIF211=0.351352 mm and HIF211/HOI=0.100137373.

The third lens element 130 has positive refractive power and it is made of plastic material. The third lens element 130 has a convex object-side surface 132 and a concave image-side surface 134, both of the object-side surface 132 and the image-side surface 134 are aspheric, and each of the object-side surface 132 and the image-side surface 134 has an inflection point. A distance in parallel with an optical axis from an inflection point on the object-side surface of the third lens element is nearest to the optical axis to an axial point on the object-side surface of the third lens element is denoted by SGI311. A distance in parallel with an optical axis from an inflection point on the image-side surface of the third lens element is nearest to the optical axis to an axial point on the image-side surface of the third lens element is denoted by SGI321. The following relation is satisfied: SGI311=0.000978339 mm, SGI321=0.00203462 mm, |SGI311|/(|SGI311|+TP3)=0.006289852 and |SGI321|/(|SGI321|+TP3)=0.003034359.

A distance perpendicular to the optical axis between an inflection point on the object-side surface of the third lens element is nearest to the optical axis and the optical axis is denoted by HIF311. A distance perpendicular to the optical axis between an inflection point on the image-side surface of the third lens element is nearest to the optical axis and an axial point on the image-side surface of the third lens element is denoted by HIF321. The following relation is satisfied: HIF311=0.148707 mm, HIF321=0.231176 mm, HIF311/HOI=0.042382364 and HIF321/HOI=0.065886511.

The fourth lens element 140 has positive refractive power and it is made of plastic material. The fourth lens element 140 has a concave object-side surface 142 and a convex image-side surface 144, and both of the object-side surface 142 and the image-side surface 144 are aspheric.

The fifth lens element 150 has positive refractive power and it is made of plastic material. The fifth lens element 150 has a concave object-side surface 152 and a convex image-side surface 154, and both of the object-side surface 152 and the image-side surface 154 are aspheric.

The sixth lens element 160 has negative refractive power and it is made of plastic material. The sixth lens element 160 has a convex object-side surface 162 and a concave image-side surface 164, both of the object-side surface 162 and the image-side surface 164 are aspheric, and each of the object-side surface 162 and the image-side surface 164 has inflection points.

The related feature of inflection point values in the embodiment shown as below is obtained by using the primary reference wavelength 555 nm.

The IR-bandstop filter 180 is made of glass material without affecting the focal length of the optical image capturing system and it is disposed between the sixth lens element 160 and the image plane 170.

In the first embodiment of the optical image capturing system, a focal length of the optical image capturing system is f, an entrance pupil diameter of the optical image capturing system is HEP, an aperture value of the optical image capturing system is f/HEP, and half of a maximal view angle of the optical image capturing system is HAF. The detailed parameters are shown as below: f=2.6908 mm, f/HEP=2.4, HAF=50 degree and tan(HAF)=1.1917.

In the first embodiment of the optical image capturing system, a focal length of the first lens element 110 is f1 and a focal length of the sixth lens element 160 is f6. The following relation is satisfied: f1=1626.5761, |f/f1|=0.0016, f6=−2.2532, f1>f6 and |f1/f6|=721.896.

In the first embodiment of the optical image capturing system, focal lengths of the second lens element 120, the third lens element 130, the fourth lens element 140, and the fifth lens element 150 are f2, f3, f4, and f5, respectively. The following relation is satisfied: |f2|+|f3|+|f4|+|f5|=114.4518 and |f1|+|f6|=1628.829.

In the first embodiment of the optical image capturing system, the focal length of the second lens element 120 is f2 and focal length of the fifth lens element 150 is f5. The following relation is satisfied: f2=4.6959, f5=10.0868, f1/f5=161.2579 and |f6/f2|=0.4798.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR=f/f1+f/f2+f/f3+f/f4+f/f5=2.1575. A sum of the NPR of all lens elements with negative refractive powers is ΣNPR=f/f=−1.1942. ΣPPR/|ΣNPR|=1.8066. The following relation is satisfied: |f/f1|=0.0018, |f/f2|=0.5735, |f/f3|=0.0277, |f/f4|=1.2901, |f/f5|=0.2684 and |f/f6|=1.996.

In the first embodiment of the optical image capturing system, a distance from the object-side surface 112 of the first lens element to the image-side surface 164 of the sixth lens element is InTL. A distance from the object-side surface 112 of the first lens element to the image plane is HOS. The following relation is satisfied: InTL+BFL=HOS, HOS=5.3843 mm, HOI=3.5087 mm, HOS/HOI=1.5346, InTL/HOS=0.7426, HOS/f=2.005527537, InS=4.57949 mm and InS/HOS=0.8505.

In the first embodiment of the optical image capturing system, a total central thickness of all lens elements with refractive power on the optical axis is ΣTP. The following relation is satisfied: ΣTP/InTL=0.7781.

In the first embodiment of the optical image capturing system, a focal length of the sixth lens element 160 is f6. A sum of focal lengths of all lens elements with negative refractive power is ΣNP. The following relation is satisfied: ΣNP=f6=−2.23807 mm. In subsequent embodiments, the negative refractive power of the sixth lens element can be allocated to others concave lens elements properly, so as to suppress the significant aberrations generated in the process of moving the incident light.

In the first embodiment of the optical image capturing system, a distance between the first lens element 110 and the second lens element 120 on the optical axis is IN12. The following relation is satisfied: IN12=0.485286 mm and IN12/f=0.1804. Hereby, the chromatic aberration of the lens elements can be improved, such that the performance can be increased.

In the first embodiment of the optical image capturing system, Central thicknesses of the first lens element 110 and the second lens element 120 on the optical axis are TP1 and TP2, respectively. The following relation is satisfied: TP1=0.376116 mm, TP2=0.639748 mm and (TP1+IN12)/TP2=1.3466. Hereby, the sensitivity produced by the optical image capturing system can be controlled, and the performance can be increased.

In the first embodiment of the optical image capturing system, central thicknesses of the fifth lens element 150 and the sixth lens element 160 on the optical axis are TP5 and TP6, respectively, and a distance between aforementioned two lens elements on the optical axis is IN56. The following relation is satisfied: TP5=0.395507 mm, TP6=0.300067 mm and (TP6+IN56)/TP5=0.946780967. Hereby, the sensitivity produced by the optical image capturing system can be controlled and the total height of the optical image capturing system can be reduced.

In the first embodiment of the optical image capturing system, central thicknesses of the third lens element 130, the fourth lens element 140, and the fifth lens element 150 on the optical axis are TP3, TP4, and TP5, respectively. A distance between the third lens element 130 and the fourth lens element 140 on the optical axis is IN34. A distance between the fourth lens element 140 and the fifth lens element 150 on the optical axis is IN45. The following relation is satisfied: TP3=0.321442 mm, TP4=1.07844 mm and (TP3+TP4+TP5)/ΣTP=0.577050577. Hereby, the aberration generated by the process of moving the incident light can be adjusted slightly layer upon layer, and the total height of the optical image capturing system can be reduced.

In the first embodiment of the optical image capturing system, a distance in parallel with an optical axis from a maximum effective diameter position to an axial point on the object-side surface of the sixth lens element is InRS61. A distance in parallel with an optical axis from a maximum effective diameter position to an axial point on the image-side surface of the sixth lens element is InRS62. A central thickness of the sixth lens element on the optical axis is TP6. The following relation is satisfied: InRS61=0.0360642 mm, InRS62=0.0509255 mm, |InRS61|+|InRS62|=0.0869897 mm and |InRS62|/TP6=0.169713764. Hereby, its favorable for manufacturing and forming the lens element and for maintaining the minimization for the optical image capturing system.

In the first embodiment of the optical image capturing system, a distance perpendicular to the optical axis between a critical point on the object-side surface 162 of the sixth lens element and the optical axis is HVT61. A distance perpendicular to the optical axis between a critical point on the image-side surface 164 of the sixth lens element and the optical axis is HVT62. The following relation is satisfied: HVT61=0 mm and HVT62=0 mm.

In the first embodiment of the optical image capturing system, The following relation is satisfied: HVT62/HOI=0. Hereby, the aberration of surrounding view field for the optical image capturing system can be corrected beneficially.

In the first embodiment of the optical image capturing system, the following relation is satisfied: HVT62/HOS=–0. Hereby, the aberration of surrounding view field for the optical image capturing system can be corrected beneficially.

In the first embodiment of the optical image capturing system, TV distortion for image formation in the optical image capturing system is TDT and optical distortion for image formation in the optical image capturing is ODT. The following relation is satisfied: |TDT|=0.28% and |ODT|=2.755%.

In the first embodiment of the optical image capturing system, a curvature radius on the object-side surface 112 of the first lens element is R1. A curvature radius on the image-side surface 114 of the first lens element is R2. The following relation is satisfied: |R1/R2|=1.0503.

In the first embodiment of the optical image capturing system, a curvature radius on the object-side surface of the sixth lens element is R11. A curvature radius on the image-side surface of the sixth lens element is R12. The following relation is satisfied: (R11−R12)/(R1+R2)=0.3650.

Please refer to the following Table 1 and Table 2.

The detailed data of the optical image capturing system of the first embodiment is as shown in Table 1.

TABLE 1

Data of the optical image capturing system
f = 2.6908 mm; f/HEP = 2.4; HAF = 50 deg

| Surface # | | Curvature Radius | Thickness | Material | Index | Abbe # | Focal length |
|---|---|---|---|---|---|---|---|
| 0 | Object | INFINITY | INFINITY | | | | |
| 1 | Lens 1 | 2.78899 | 0.376116 | Plastic | 1.6 | 0.233 | 1481.6 |
| 2 | | 2.65554 | 0.428716 | | | | |
| 3 | Ape. stop | Plano | 0.056571 | | | | |
| 4 | Lens 2 | 9.26731 | 0.639748 | Plastic | 1.565 | 0.58 | 4.6813 |
| 5 | | −3.62481 | 0.096041 | | | | |
| 6 | Lens 3 | 9.42178 | 0.321442 | Plastic | 1.64 | 0.233 | 96.798 |
| 7 | | 10.948 | 0.154428 | | | | |
| 8 | Lens 4 | −2.42448 | 1.078439 | Plastic | 1.565 | 0.58 | 2.081 |
| 9 | | −0.92115 | 0.076837 | | | | |
| 10 | Lens 5 | −2.78002 | 0.395507 | Plastic | 1.64 | 0.233 | 10.001 |
| 11 | | −2.05109 | 0.074391 | | | | |
| 12 | Lens 6 | 1.30301 | 0.300067 | Plastic | 1.6 | 0.233 | −2.238 |
| 13 | | 0.60621 | 0.6 | | | | |
| 14 | IR-bandstop filter | Plano | 0.2 | | 1.517 | 0.642 | |
| 15 | | Plano | 0.561634 | | | | |
| 16 | Image plane | Plano | 0.024379 | | | | |

Reference wavelength (d-line) = 587.5 nm

As for the parameters of the aspheric surfaces of the first embodiment, reference is made to Table 2.

TABLE 2

Aspheric Coefficients

| | Surface # | | | | | |
|---|---|---|---|---|---|---|
| | 1 | 2 | 4 | 5 | 6 | 7 |
| k = | 1.68600E+00 | 4.94339E+00 | −4.83578E−01 | −8.96763E−01 | 5.00000E+01 | 5.00000E+01 |
| A4 = | 6.51521E−02 | 1.12975E−01 | −3.40758E−02 | −3.52914E−01 | −4.06335E−01 | −1.46882E−01 |
| A6 = | 1.19757E−03 | −6.47484E−02 | −6.40404E−01 | 3.22138E−02 | −2.27390E−02 | −4.44146E−03 |
| A8 = | 1.80068E−02 | 2.31656E−01 | −1.78261E−01 | 4.68349E−02 | −6.14411E−03 | 4.68741E−03 |
| A10 = | 5.48876E−03 | −1.26915E−01 | 3.60449E−02 | −2.11963E−01 | −9.73580E−02 | −5.32442E−03 |
| A12 = | | | | | | |
| A14 = | | | | | | |

| | Surface # | | | | | |
|---|---|---|---|---|---|---|
| | 8 | 9 | 10 | 11 | 12 | 13 |
| k = | −3.62606E−01 | −1.63016E+00 | 2.00063E+00 | −1.96473E−01 | −1.69636E+01 | −3.85800E+00 |
| A4 = | −1.34763E−02 | −3.32385E−02 | −4.48808E−02 | 3.77852E−02 | −9.16357E−02 | −5.71890E−02 |
| A6 = | −8.64743E−03 | −2.39251E−02 | 2.34836E−02 | −3.05524E−02 | 3.17960E−02 | 6.39533E−03 |

TABLE 2-continued

Aspheric Coefficients

| | | | | | | |
|---|---|---|---|---|---|---|
| A8 = | 3.59649E−02 | −7.98438E−04 | −6.90649E−04 | 5.25025E−03 | −2.35080E−02 | −1.17052E−03 |
| A10 = | −7.91459E−03 | 6.59537E−03 | −3.20235E−04 | 3.57015E−04 | −5.02858E−03 | −1.75415E−05 |
| A12 = | | | −6.83557E−05 | 4.14314E−04 | 5.60637E−03 | 5.79251E−05 |
| A14 = | | | −1.72867E−05 | −6.90825E−05 | −9.01213E−04 | −6.07829E−06 |

Table 1 is the detailed structure data to the first embodiment in FIG. 1A, wherein the unit of the curvature radius, the thickness, the distance, and the focal length is millimeters (mm). Surfaces 0-16 illustrate the surfaces from the object side to the image plane in the optical image capturing system. Table 2 is the aspheric coefficients of the first embodiment, wherein k is the conic coefficient in the aspheric surface formula, and $A_i$ is an $i^{th}$ order aspheric surface coefficient. Besides, the tables in following embodiments are referenced to the schematic view and the aberration graphs, respectively, and definitions of parameters in the tables are equal to those in the Table 1 and the Table 2, so the repetitious details need not be given here.

The Second Embodiment (Embodiment 2)

Figure 2A:
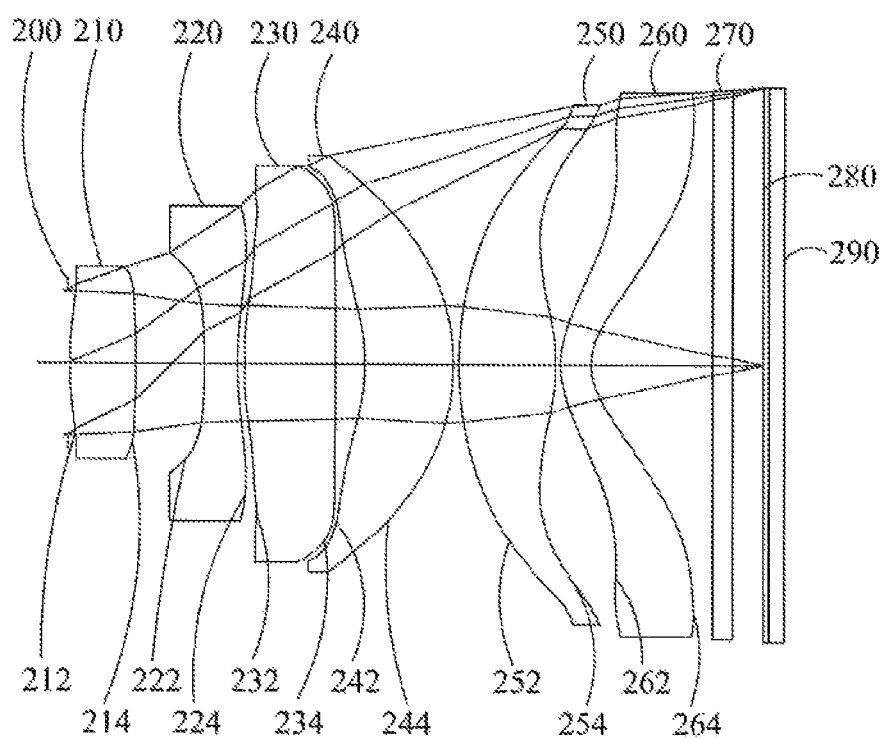
FIG. 2A is a schematic view of the optical image capturing system according to the second embodiment of the present application.
Figure 2B:
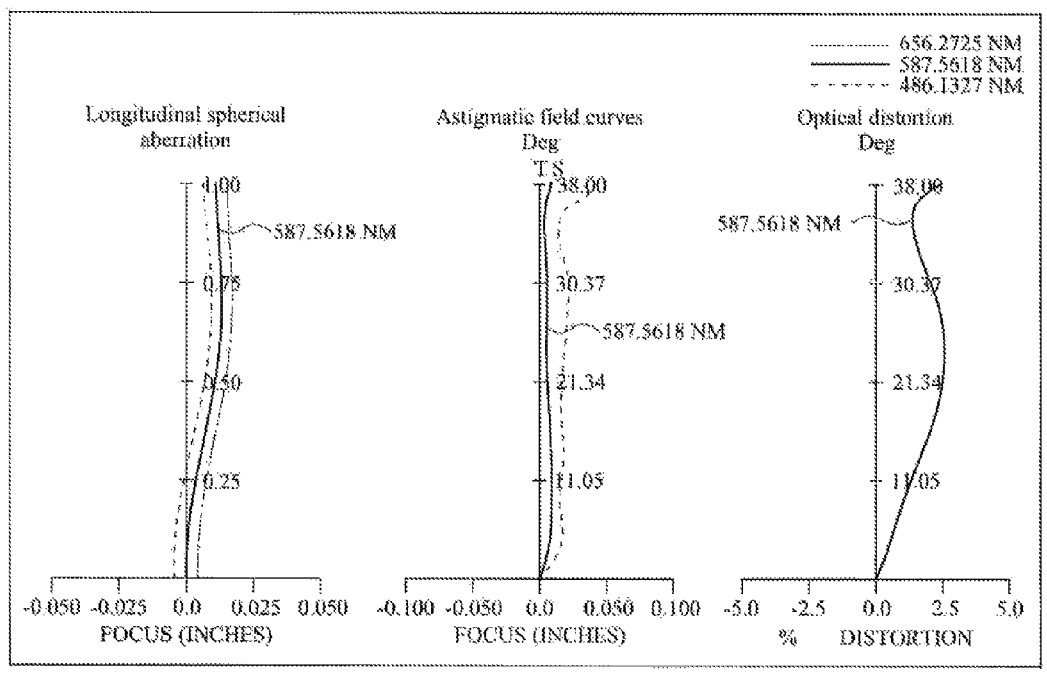
FIG. 2B is longitudinal spherical aberration curves, astigmatic field curves, and an optical distortion grid of the optical image capturing system in the order from left to right according to the second embodiment of the present application.
Figure 2C:
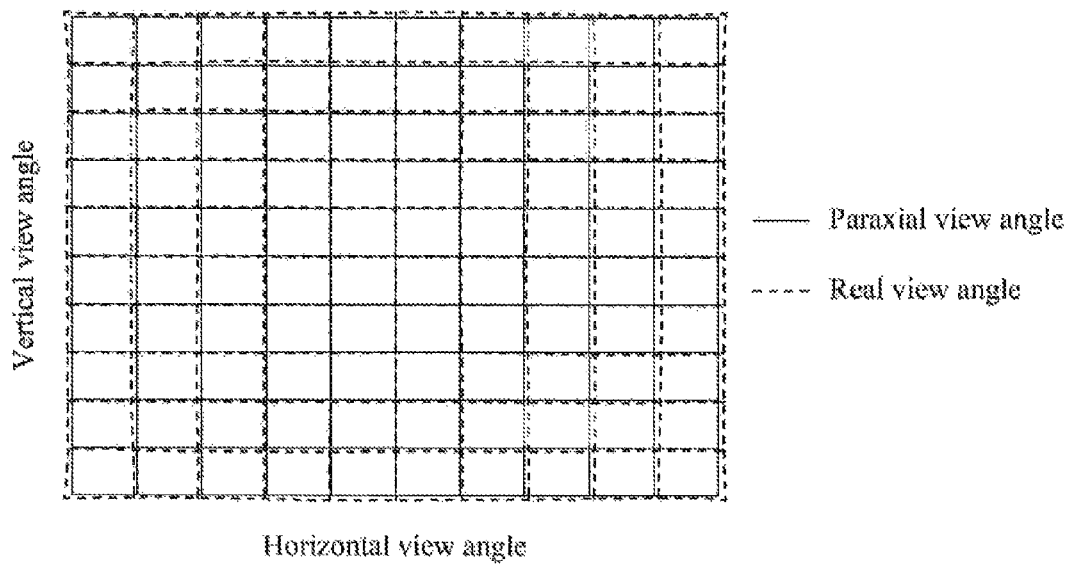
FIG. 2C is a TV distortion grid of the optical image capturing system according to the second embodiment of the present application.

Please refer to FIG. 2A, FIG. 2B, and FIG. 2C, FIG. 2A is a schematic view of the optical image capturing system according to the second embodiment of the present application, FIG. 2B is longitudinal spherical aberration curves, astigmatic field curves, and an optical distortion curve of the optical image capturing system in the order from left to right according to the second embodiment of the present application, and FIG. 2C is a TV distortion grid of the optical image capturing system according to the second embodiment of the present application. As shown in FIG. 2A, in order from an object side to an image side, the optical image capturing system includes an aperture stop 200, first lens element 210, a second lens element 220, a third lens element 230, a fourth lens element 240, a fifth lens element 250, a sixth lens element 260, an IR-bandstop filter 270, an image plane 280, and an image sensing device 290.

The first lens element 210 has positive refractive power and it is made of plastic material. The first lens element 210 has a convex object-side surface 212 and a convex image-side surface 214, both of the object-side surface 212 and the image-side surface 214 are aspheric, and the object-side surface 212 has an inflection point.

The second lens element 220 has negative refractive power and it is made of plastic material. The second lens element 220 has a concave object-side surface 222 and a concave image-side surface 224, both of the object-side surface 222 and the image-side surface 224 are aspheric, and the image-side surface 224 has an inflection point.

The third lens element 230 has negative refractive power and it is made of plastic material. The third lens element 230 has a convex object-side surface 232 and a convex image-side surface 234, both of the object-side surface 232 and the image-side surface 234 are aspheric, and the object-side surface 232 has an inflection point.

The fourth lens element 240 has positive refractive power and it is made of plastic material. The fourth lens element 240 has a concave object-side surface 242 and a convex image-side surface 244, both of the object-side surface 242 and the image-side surface 244 are aspheric, the object-side surface 242 has two inflection points and the image-side surface 244 has an inflection point.

The fifth lens element 250 has positive refractive power and it is made of plastic material. The fifth lens element 250 has a convex object-side surface 252 and a convex image-side surface 254, both of the object-side surface 252 and the image-side surface 254 are aspheric, the object-side surface 252 has an inflection point and the image-side surface 254 has two inflection points.

The sixth lens element 260 has negative refractive power and it is made of plastic material. The sixth lens element 260 has a convex object-side surface 262 and a concave image-side surface 264, both of the object-side surface 262 and the image-side surface 264 are aspheric, the object-side surface 262 has two inflection points and the image-side surface 264 has an inflection point.

The IR-bandstop filter 270 is made of glass material without affecting the focal length of the optical image capturing system and it is disposed between the sixth lens element 260 and the image plane 280.

In the second embodiment of the optical image capturing system, focal lengths of the second lens element 220, the third lens element 230, the fourth lens element 240, and the fifth lens element 250 are f2, f3, f4, and f5, respectively. The following relation is satisfied: |f2|+|f3|+|f4|+|f5|=66.469, In |f1|+|f6|=9.0956 and |f2|+|f3|+|f4|+|f5|>|f1|+|f6|.

In the second embodiment of the optical image capturing system, a central thickness of the fifth lens element on the optical axis is TP5. A central thickness of the sixth lens element on the optical axis is TP6. The following relation is satisfied: TP5=0.9476 mm and TP6=0.3 mm.

In the second embodiment of the optical image capturing system, the first lens element 210, the third lens element 230, the fourth lens element 240 and the fifth lens element 250 are positive lens element, and focal lengths of the first lens element 210, the third lens element 230, the fourth lens element 240 and the fifth lens element 250 are f1, f3, f4, and f5, respectively. A sum of focal lengths of all lens elements with positive refractive power is ΣPP. The following relation is satisfied: ΣPP=f1+f3+f4+f5=67.8427 mm and f1/(f1+f3+f4+f5)=0.0873. Hereby, it's favorable for allocating the positive refractive power of the first lens element 210 to others positive lens elements and the significant aberrations generated in the process of moving the incident light can be suppressed.

In the second embodiment of the optical image capturing system, focal lengths of the second lens element 220 and the sixth lens element 260 are f2 and f6, respectively. A sum of focal lengths of all lens elements with negative refractive power is ΣNP. The following relation is satisfied: ΣNP=f2+f6=−7.1980 mm and f6/(f2+f6)=0.4346. Hereby, it's favorable for allocating the negative refractive power of the sixth lens element 260 to others concave lens elements.

In the second embodiment of the optical image capturing system, a distance perpendicular to the optical axis between a critical point on the object-side surface 262 of the sixth lens element and the optical axis is HVT61. A distance perpendicular to the optical axis between a critical point on the image-side surface 264 of the sixth lens element and the optical axis is HVT62. The following relation is satisfied: HVT61=0, HVT62=2.3774 and HVT61/HVT62=0.

Please refer to the following Table 3 and Table 4.

The detailed data of the optical image capturing system of the second embodiment is as shown in Table 3.

TABLE 3

Data of the optical image capturing system
f = 3.4127 mm; f/HEP = 2.4; HAF = 38 deg

| Surface # | | Curvature Radius | Thickness | Material | Index | Abbe # | Focal length |
|---|---|---|---|---|---|---|---|
| 0 | Object | Plano | Plano | | | | |
| 1 | Ape. stop | Plano | 0.022515 | | | | |
| 2 | Lens 1 | 4.24829 | 0.642602 | Plastic | 1.585 | 40.6 | 5.923 |
| 3 | | −18.1329 | 0.670088 | | | | |
| 4 | Lens 2 | −8.4625 | 0.319658 | Plastic | 1.601 | 23.3 | −4.07 |
| 5 | | 3.52781 | 0.07536 | | | | |
| 6 | Lens 3 | 3.6478 | 0.900314 | Plastic | 1.565 | 58 | 6.061 |
| 7 | | −53.6219 | 0.277289 | | | | |
| 8 | Lens 4 | −1.918 | 0.862184 | Plastic | 1.565 | 58 | 53.455 |
| 9 | | −2.09713 | 0.05 | | | | |
| 10 | Lens 5 | 3.65405 | 0.947617 | Plastic | 1.565 | 58 | 2.404 |
| 11 | | −1.96828 | 0.05 | | | | |
| 12 | Lens 6 | 0.97772 | 0.3 | Plastic | 1.64 | 23.3 | −3.128 |
| 13 | | 0.57934 | 1.00641 | | | | |
| 14 | IR-bandstop filter | Plano | 0.2 | | 1.517 | 64.2 | |
| 15 | | Plano | 0.486298 | | | | |
| 16 | Image plate | Plano | 0.011969 | | | | |

Reference wavelength (d-line) = 587.5 nm

As for the parameters of the aspheric surfaces of the second embodiment, reference is made to Table 4.

TABLE 4

Aspheric Coefficients

| Surface # | 2 | 3 | 4 | 5 | 6 | 7 |
|---|---|---|---|---|---|---|
| k = | −9.85512 | 33.075908 | 49.837327 | −28.577922 | −29.256708 | 50 |
| A4 = | −1.09654E−03 | −5.01247E−02 | −8.75059E−02 | −1.68243E−02 | −1.90478E−02 | −6.01034E−03 |
| A6 = | −2.42392E−02 | −3.29618E−02 | −5.00079E−02 | −5.87559E−03 | 3.91565E−03 | 4.15436E−03 |
| A8 = | 1.67260E−02 | 6.72303E−03 | 1.48278E−02 | 6.22816E−04 | −4.83332E−04 | 3.58898E−04 |
| A10 = | −3.07911E−02 | −1.82157E−02 | −3.13209E−02 | 2.91751E−05 | −5.28454E−05 | −6.94498E−04 |
| A12 = | | | | | | |
| A14 = | | | | | | |

| Surface # | 8 | 9 | 10 | 11 | 12 | 13 |
|---|---|---|---|---|---|---|
| k = | −4.538533 | −4.979675 | −0.240487 | −9.448272 | −3.396288 | −2.208444 |
| A4 = | 3.77821E−02 | −4.10811E−02 | 7.38282E−03 | 4.79840E−02 | −2.90907E−02 | −4.21290E−02 |
| A6 = | 2.50879E−03 | −1.45167E−03 | −6.57414E−04 | −2.83038E−03 | −1.18895E−03 | 5.38169E−03 |
| A8 = | −1.64750E−03 | 9.49143E−04 | 4.53860E−04 | 1.33374E−05 | 6.70672E−04 | −4.05937E−04 |
| A10 = | −3.18088E−04 | −3.67090E−05 | −7.04502E−05 | −1.42563E−05 | −4.26366E−05 | −1.89463E−05 |
| A12 = | | | | | 4.19554E−06 | 7.89908E−06 |
| A14 = | | | | | −3.84531E−07 | −4.81280E−07 |

In the second embodiment, the presentation of the aspheric surface formula is similar to that in the first embodiment. Besides, the definitions of parameters in following tables are equal to those in the first embodiment, so the repetitious details need not be given here.

The following content may be deduced from Table 3 and Table 4.

Second embodiment (Primary reference wavelength = 555 nm)

| |TDT| | 1.1899% | InRS61 | 0.5809 |
|---|---|---|---|
| |ODT| | 2.5371% | InRS62 | 0.9933 |
| ΣPP | 67.8427 | |InRS61|/TP6 | 1.9363 |
| ΣNP | −7.1980 | |InRS62|/TP6 | 3.3110 |
| f1/ΣPP | 0.0873 | |f/f1| | 0.5757 |
| f6/ΣNP | 0.4346 | |f/f2| | 0.8379 |

Second embodiment (Primary reference wavelength = 555 nm)

| IN12/f | 0.1965 | |f/f3| | 0.5627 |
|---|---|---|---|
| HOS/f | 1.9941 | |f/f4| | 0.0638 |
| HOS | 6.7998 | |f/f5| | 1.4187 |
| InTL | 5.0951 | |f/f6| | 1.0901 |
| HOS/HOI | 2.4903 | (TP1 + IN12)/TP2 | 4.1065 |
| InS/HOS | 1.0033 | (TP6 + IN56)/TP5 | 0.3693 |
| InTL/HOS | 0.7493 | (TP2 + TP3 + TP4)/ΣTP | 0.6822 |
| ΣTP/InTL | 0.7796 | | |

The following content may be deduced from Table 3 and Table 4.

Related inflection point values of second embodiment (Primary reference wavelength: 555 nm)

| | | | | | | | |
|---|---|---|---|---|---|---|---|
| HIF111 | 0.66647 | HIF111/HOI | 0.2441 | SGI111 | 0.0474812 | \|SGI111\|/(\|SGI111\| + TP1) | 0.0688 |
| HIF221 | 0.636687 | HIF221/HOI | 0.2332 | SGI221 | 0.0451866 | \|SGI221\|/(\|SGI221\| + TP2) | 0.1239 |
| HIF311 | 0.717321 | HIF311/HOI | 0.2627 | SGI311 | 0.0531089 | \|SGI311\|/(\|SGI311\| + TP3) | 0.0557 |
| HIF411 | 0.76269 | HIF411/HOI | 0.2793 | SGI411 | −0.1218 | \|SGI411\|/(\|SGI411\| + TP4) | 0.1238 |
| HIF412 | 1.38477 | HIF412/HOI | 0.5071 | SGI412 | −0.24605 | \|SGI412\|/(\|SGI412\| + TP4) | 0.2220 |
| HIF421 | 2.04303 | HIF421/HOI | 0.7482 | SGI421 | −1.20448 | \|SGI421\|/(\|SGI421\| + TP4) | 0.5828 |
| HIF511 | 2.15892 | HIF511/HOI | 0.7907 | SGI511 | 0.839843 | \|SGI511\|/(\|SGI511\| + TP5) | 0.4699 |
| HIF521 | 0.61537 | HIF521/HOI | 0.2254 | SGI521 | −0.0751 | \|SGI521\|/(\|SGI521\| + TP5) | 0.0734 |
| HIF522 | 2.2451 | HIF522/HOI | 0.8222 | SGI522 | 0.24506 | \|SGI522\|/(\|SGI522\| + TP5) | 0.2055 |
| HIF611 | 0.81304 | HIF611/HOI | 0.2978 | SGI611 | 0.244137 | \|SGI611\|/(\|SGI611\| + TP6) | 0.4487 |
| HIF612 | 2.11291 | HIF612/HOI | 0.7738 | SGI612 | 0.541434 | \|SGI612\|/(\|SGI612\| + TP6) | 0.6435 |
| HIF621 | 0.819035 | HIF621/HOI | 0.3000 | SGI621 | 0.389143 | \|SGI621\|/(\|SGI621\| + TP6) | 0.5647 |

The Third Embodiment (Embodiment 3)

Figure 3A:
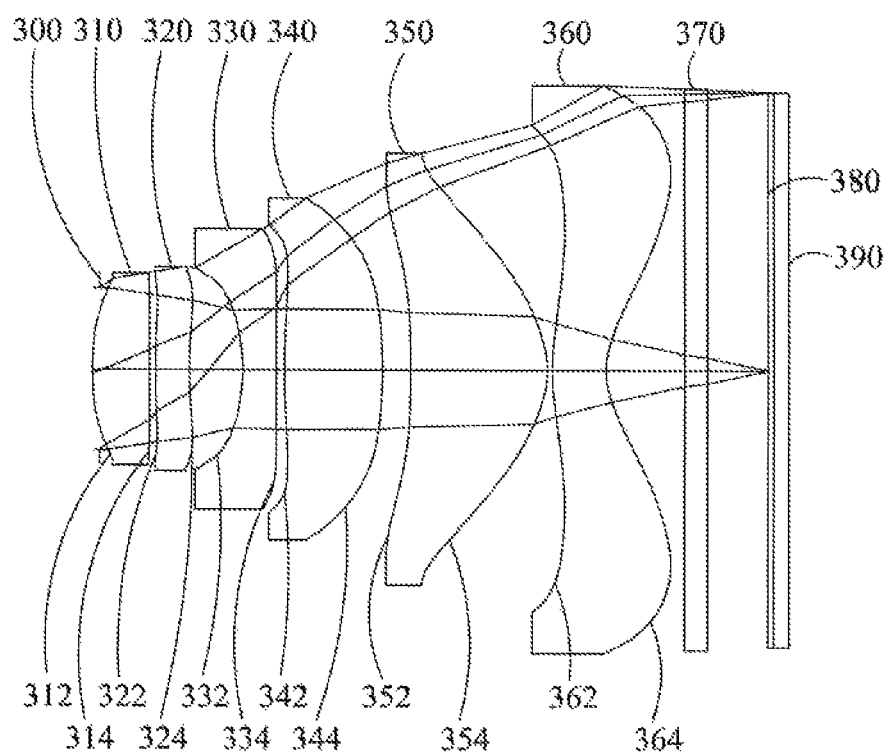
FIG. 3A is a schematic view of the optical image capturing system according to the third embodiment of the present application.
Figure 3B:
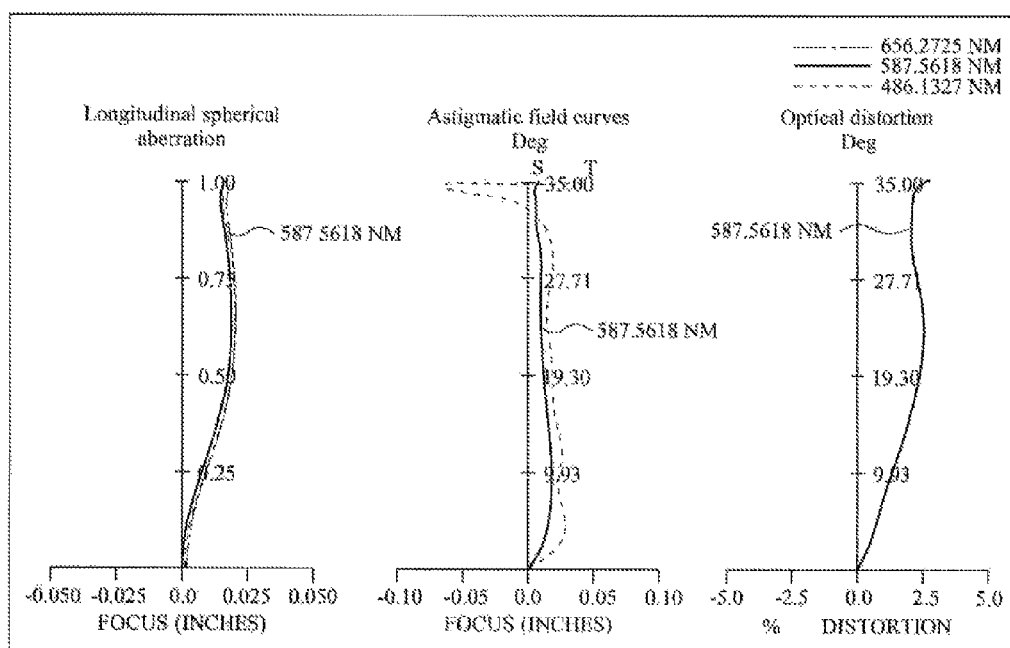
FIG. 3B is longitudinal spherical aberration curves, astigmatic field curves, and an optical distortion grid of the optical image capturing system in the order from left to right according to the third embodiment of the present application.
Figure 3C:
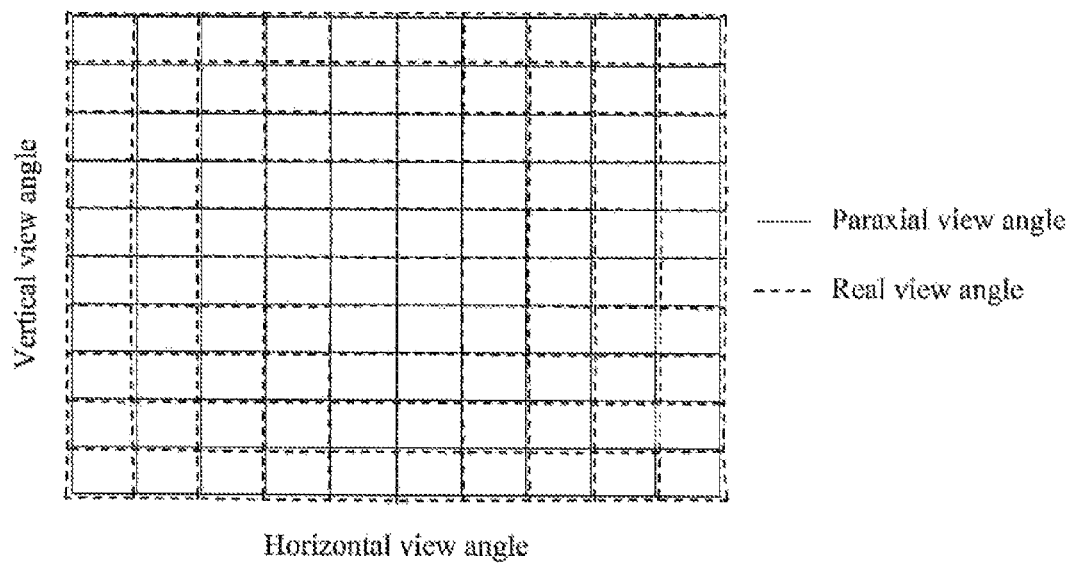
FIG. 3C is a TV distortion grid of the optical image capturing system according to the third embodiment of the present application.

Please refer to FIG. 3A, FIG. 3B, and FIG. 3C, FIG. 3A is a schematic view of the optical image capturing system according to the third embodiment of the present application, FIG. 3B is longitudinal spherical aberration curves, astigmatic field curves, and an optical distortion curve of the optical image capturing system in the order from left to right according to the third embodiment of the present application, and FIG. 3C is a TV distortion grid of the optical image capturing system according to the third embodiment of the present application. As shown in FIG. 3A, in order from an object side to an image side, the optical image capturing system includes an aperture stop 300, first lens element 310, a second lens element 320, a third lens element 330, a fourth lens element 340, a fifth lens element 350, a sixth lens element 360, an IR-bandstop filter 370, an image plane 380, and an image sensing device 390.

The first lens element 310 has positive refractive power and it is made of plastic material. The first lens element 310 has a convex object-side surface 312 and a convex image-side surface 314, both of the object-side surface 312 and the image-side surface 314 are aspheric, and the image-side surface 314 has three inflection points.

The second lens element 320 has negative refractive power and it is made of plastic material. The second lens element 320 has a convex object-side surface 322 and a concave image-side surface 324, both of the object-side surface 322 and the image-side surface 324 are aspheric, the object-side surface 322 has two inflection points and the image-side surface 324 has an inflection point.

The third lens element 330 has negative refractive power and it is made of plastic material. The third lens element 330 has a concave object-side surface 332 and a convex image-side surface 334, and both of the object-side surface 332 and the image-side surface 334 are aspheric.

The fourth lens element 340 has positive refractive power and it is made of plastic material. The fourth lens element 340 has a convex object-side surface 342 and a convex image-side surface 344, both of the object-side surface 342 and the image-side surface 344 are aspheric, and the object-side surface 342 has an inflection point.

The fifth lens element 350 has positive refractive power and it is made of plastic material. The fifth lens element 350 has a concave object-side surface 352 and a convex image-side surface 354, both of the object-side surface 352 and the image-side surface 354 are aspheric, the object-side surface 352 has two inflection points and the image-side surface 354 has an inflection point.

The sixth lens element 360 has negative refractive power and it is made of plastic material. The sixth lens element 360 has a convex object-side surface 362 and a concave image-side surface 364, both of the object-side surface 362 and the image-side surface 364 are aspheric, and each of the object-side surface 362 and the image-side surface 364 has an inflection point.

The IR-bandstop filter 370 is made of glass material without affecting the focal length of the optical image capturing system and it is disposed between the sixth lens element 360 and the image plane 380.

In the third embodiment of the optical image capturing system, focal lengths of the second lens element 320, the third lens element 330, the fourth lens element 340, and the fifth lens element 350 are f2, f3, f4, and f5, respectively. The following relation is satisfied: |f2|+|f3|+|f4|+|f5|=28.7717, |f1|+|f6|=5.6695 and |f2|+|f3|+|f4|+|f5|>|f1|+|f6|.

In the third embodiment of the optical image capturing system, a central thickness of the fifth lens element 350 on the optical axis is TP5. A central thickness of the sixth lens element 360 on the optical axis is TP6. The following relation is satisfied: TP5=1.19908 mm and TP6=0.47314 mm.

In the third embodiment of the optical image capturing system, the first lens element 310, the fourth lens element 340 and the fifth lens element 350 are positive lens elements, and focal lengths of the first lens element 310, the fourth lens element 340 and the fifth lens element 350 are f1, f4, and f5, respectively. A sum of focal lengths of all lens elements with positive refractive power is ΣPP. The following relation is satisfied: ΣPP=f1+f4+f5=10.1481 mm and f1/(f1+f4+f5)=0.3688. Hereby, it's favorable for allocating the positive refractive power of the first lens element 310 to others positive lens elements and the significant aberrations generated in the process of moving the incident light can be suppressed.

In the third embodiment of the optical image capturing system, focal lengths of the second lens element 320, the third lens element 330 and the sixth lens element 360 are f2, f3 and f6, respectively. A sum of focal lengths of all lens elements with negative refractive power is ΣNP. The following relation is satisfied: ΣNP=f2+f3+f6=−24.1578 mm and f6/(f2+f3+f6)=0.0788. Hereby, it's favorable for allocating the negative refractive power of the sixth lens element 360 to others concave lens elements.

In the third embodiment of the optical image capturing system, a distance perpendicular to the optical axis between a critical point on the object-side surface 362 of the sixth lens element and the optical axis is HVT61. A distance perpendicular to the optical axis between a critical point on the image-side surface 364 of the sixth lens element and the optical axis is HVT62. The following relation is satisfied: HVT61=1.2634, HVT62=1.7193 and HVT61/HVT62=0.7348.

Please refer to the following Table 5 and Table 6.

The detailed data of the optical image capturing system of the third embodiment is as shown in Table 5.

TABLE 5

Data of the optical image capturing system
f = 3.41 mm; f/HEP = 2.4; HAF = 35 deg

| Surface # | Curvature Radius | | Thickness | Material | Index | Abbe # | Focal length |
|---|---|---|---|---|---|---|---|
| 0 | Object | Plano | Plano | | | | |
| 1 | Ape. stop | Plano | −0.05912 | | | | |
| 2 | Lens 1 | 2.03774 | 0.504114 | Plastic | 1.524 | 47.8 | 3.757 |
| 3 | | −53.2299 | 0.050798 | | | | |
| 4 | Lens 2 | 6.50028 | 0.3 | Plastic | 1.575 | 47.8 | −19.564 |
| 5 | | 4.0503 | 0.47039 | | | | |
| 6 | Lens 3 | −1.72763 | 0.3 | Plastic | 1.64 | 23.3 | −2.783 |
| 7 | | −61.6424 | 0.067145 | | | | |
| 8 | Lens 4 | 5.34394 | 0.865222 | Plastic | 1.514 | 56.8 | 4.77 |
| 9 | | −4.28118 | 0.243233 | | | | |
| 10 | Lens 5 | −12.1187 | 1.19908 | Plastic | 1.565 | 58 | 1.655 |
| 11 | | −0.89933 | 0.050112 | | | | |
| 12 | Lens 6 | 2.07544 | 0.47314 | Plastic | 1.534 | 41.7 | −1.912 |
| 13 | | 0.63011 | 0.7 | | | | |
| 14 | IR-bandstop filter | Plano | 0.2 | | 1.517 | 64.2 | |
| 15 | | Plano | 0.532978 | | | | |
| 16 | Image plate | Plano | 0.015492 | | | | |

Reference wavelength (d-line) = 587.5 nm

As for the parameters of the aspheric surfaces of the third embodiment, reference is made to Table 6.

TABLE 6

Aspheric Coefficients

| Surface # | 2 | 3 | 4 | 5 | 6 | 7 |
|---|---|---|---|---|---|---|
| k = | 1.936588 | 19.33356 | 48.592119 | −43.590693 | 0.716691 | −50 |
| A4 = | 5.90895E−03 | 5.35827E−02 | −8.98440E−02 | −7.26602E−02 | −5.71111E−02 | −1.48507E−02 |
| A6 = | 1.69244E−02 | −8.64894E−02 | −9.91406E−02 | −1.09722E−01 | −6.64288E−02 | 5.37030E−03 |
| A8 = | −6.12407E−02 | −1.22063E−02 | −4.88843E−02 | −2.23991E−02 | −9.24151E−02 | −7.60089E−03 |
| A10 = | 2.97713E−02 | −1.58699E−02 | −4.04138E−03 | 1.08221E−02 | −8.32500E−02 | −2.61979E−03 |
| A12 = | 9.78906E−02 | 1.24832E−01 | 1.59812E−01 | 3.05786E−02 | −6.32016E−02 | −6.42978E−03 |
| A14 = | −1.34469E−01 | −6.20907E−02 | −7.22760E−02 | −3.89370E−02 | −1.87632E−02 | 2.98043E−03 |

| Surface # | 8 | 9 | 10 | 11 | 12 | 13 |
|---|---|---|---|---|---|---|
| k = | 10.711384 | −4.804501 | 40.437904 | −3.109042 | −30.301182 | −3.660591 |
| A4 = | −7.32757E−02 | −5.87424E−02 | −4.87186E−02 | −6.06828E−02 | −3.35131E−02 | −4.46215E−02 |
| A6 = | −1.32611E−02 | −1.14501E−02 | −1.59637E−03 | 9.63587E−03 | 6.27372E−03 | 1.08334E−02 |
| A8 = | −9.14617E−04 | 1.19484E−03 | 1.05361E−02 | 9.57497E−04 | 5.44723E−04 | −2.82853E−03 |
| A10 = | 1.55205E−04 | −7.57506E−04 | −6.56392E−04 | −3.12971E−04 | −1.09827E−03 | 2.44451E−04 |
| A12 = | 1.75863E−03 | 6.95375E−04 | −6.07307E−04 | 2.72536E−04 | 3.13537E−04 | 1.30230E−05 |
| A14 = | −3.97897E−03 | −2.73595E−04 | 8.94984E−05 | −5.00824E−05 | −3.13632E−05 | −2.75434E−06 |

The presentation of the aspheric surface formula in the third embodiment is similar to that in the first embodiment. Besides, the definitions of parameters in following tables are equal to those in the first embodiment so the repetitious details need not be given here.

The following content may be deduced from Table 5 and Table 6.

| Third embodiment (Primary reference wavelength: 555 nm) | | | |
|---|---|---|---|
| \|TDT\| | 0.6031% | InRS61 | −0.1847 |
| \|ODT\| | 2.5345% | InRS62 | −0.0286 |
| ΣPP | 10.1481 | \|InRS61\|/TP6 | 0.3904 |
| ΣNP | −24.1578 | \|InRS62\|/TP6 | 0.0604 |
| f1/ΣPP | 0.3688 | \|f/f1\| | 0.9106 |
| f6/ΣNP | 0.0788 | \|f/f2\| | 0.1749 |
| IN12/f | 0.0149 | \|f/f3\| | 1.2343 |
| HOS/f | 1.7520 | \|f/f4\| | 0.7168 |
| HOS | 5.9713 | \|f/f5\| | 2.0655 |
| InTL | 4.5232 | \|f/f6\| | 1.7894 |
| HOS/HOI | 2.4399 | (TP1 + IN12)/TP2 | 1.8497 |
| InS/HOS | 0.9901 | (TP6 + IN56)/TP5 | 0.4364 |
| InTL/HOS | 0.7575 | (TP2 + TP3 + TP4)/ΣTP | 0.6493 |
| ΣTP/InTL | 0.8051 | | |

The following content may be deduced from Table 5 and Table 6.

| Related inflection point values of third embodiment (Primary reference wavelength: 555 nm) | | | | | | | |
|---|---|---|---|---|---|---|---|
| HIF121 | 0.18415 | HIF121/HOI | 0.0752 | SGI121 | −0.00026 | \|SGI121\|/(\|SGI121\| + TP1) | 0.0005 |
| HIF122 | 0.45441 | HIF122/HOI | 0.1857 | SGI122 | −0.00044 | \|SGI122\|/(\|SGI122\| + TP1) | 0.0009 |
| HIF123 | 0.83099 | HIF123/HOI | 0.3395 | SGI123 | −0.00580 | \|SGI123\|/(\|SGI123\| + TP1) | 0.0114 |
| HIF211 | 0.36176 | HIF211/HOI | 0.1478 | SGI211 | 0.00871 | \|SGI211\|/(\|SGI211\| + TP2) | 0.0170 |
| HIF212 | 0.80539 | HIF212/HOI | 0.3291 | SGI212 | 0.00147 | \|SGI212\|/(\|SGI212\| + TP2) | 0.0049 |
| HIF221 | 0.35317 | HIF221/HOI | 0.1443 | SGI221 | 0.01297 | \|SGI221\|/(\|SGI221\| + TP2) | 0.0414 |
| HIF411 | 0.47194 | HIF411/HOI | 0.1928 | SGI411 | 0.01755 | \|SGI411\|/(\|SGI411\| + TP4) | 0.0199 |
| HIF511 | 1.18502 | HIF511/HOI | 0.4849 | SGI511 | −0.13201 | \|SGI511\|/(\|SGI511\| + TP5) | 0.0992 |
| HIF512 | 1.73086 | HIF512/HOI | 0.7072 | SGI512 | −0.21251 | \|SGI512\|/(\|SGI521\| + TP5) | 0.1505 |
| HIF521 | 1.36430 | HIF521/HOI | 0.5574 | SGI521 | −0.74141 | \|SGI521\|/(\|SGI521\| + TP5) | 0.3821 |
| HIF611 | 0.52863 | HIF611/HOI | 0.2160 | SGI611 | 0.04733 | \|SGI611\|/(\|SGI611\| + TP6) | 0.0909 |
| HIF621 | 0.67873 | HIF621/HOI | 0.2773 | SGI621 | 0.23342 | \|SGI621\|/(\|SGI621\| + TP6) | 0.3304 |

The Fourth Embodiment (Embodiment 4)

Figure 4A:
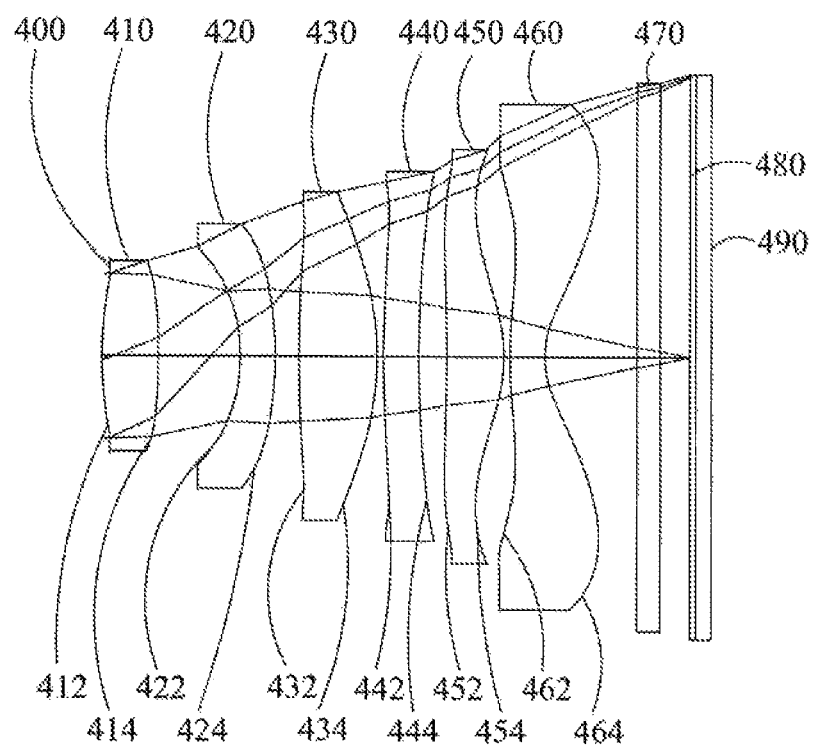
FIG. 4A is a schematic view of the optical image capturing system according to the fourth embodiment of the present application.
Figure 4B:
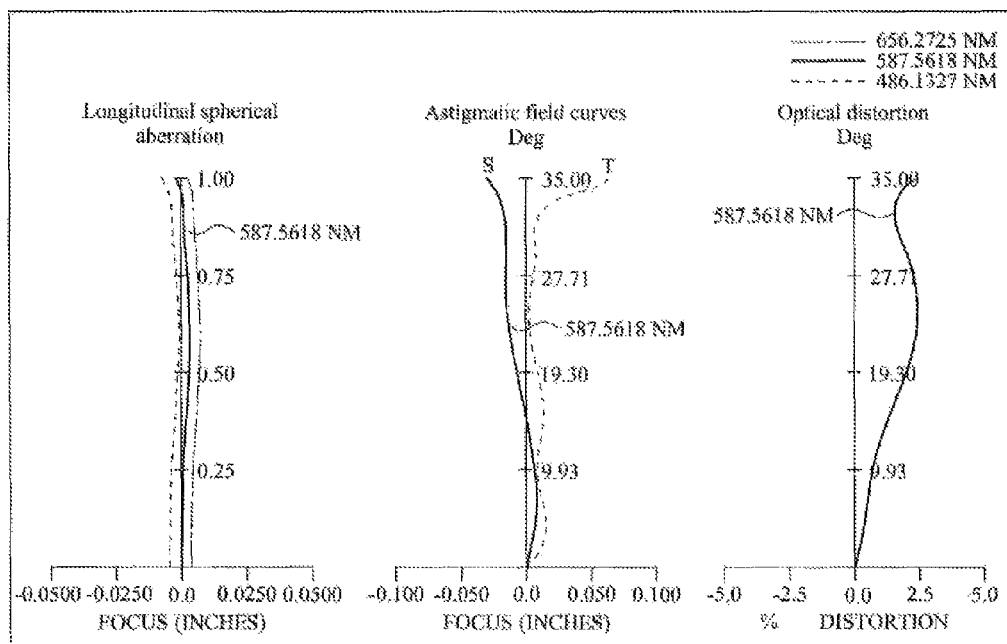
FIG. 4B is longitudinal spherical aberration curves, astigmatic field curves, and an optical, distortion grid of the optical image capturing system in the order from left to right according to the fourth embodiment of the present application.
Figure 4C:
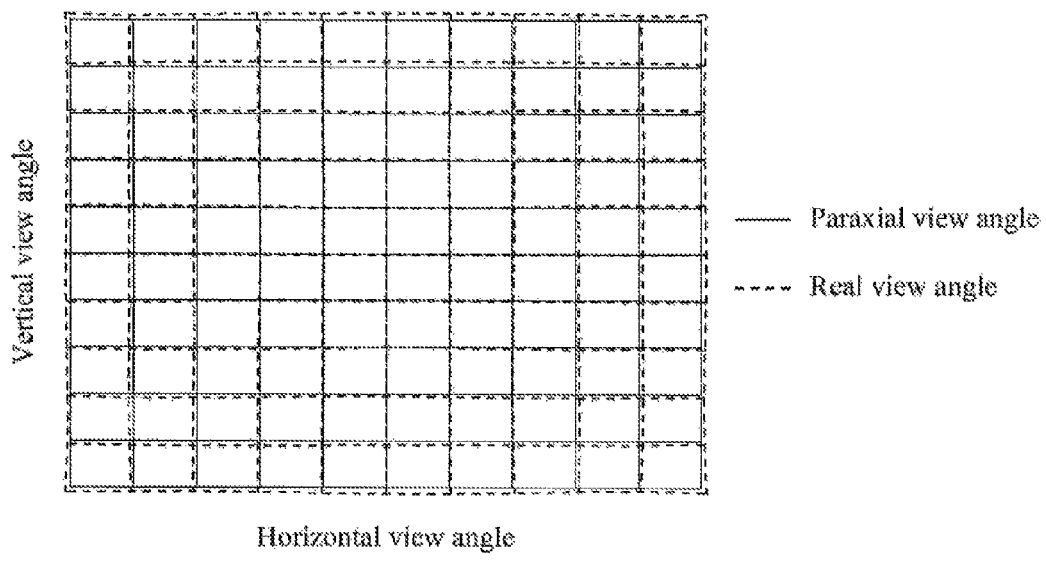
FIG. 4C is a TV distortion grid of the optical image capturing system according to the fourth embodiment of the present application.

Please refer to FIG. 4A, FIG. 4B, and FIG. 4C, FIG. 4A is a schematic view of the optical image capturing system according to the fourth embodiment of the present application, FIG. 4B is longitudinal spherical aberration curves, astigmatic field curves, and an optical distortion curve of the optical image capturing system in the order from left to right according to the fourth embodiment of the present application, and FIG. 4C is a TV distortion grid of the optical image capturing system according to the fourth embodiment of the present application. As shown in FIG. 4A, in order from an object side to an image side, the optical image capturing system includes an aperture stop 400, first lens element 410, a second lens element 420, a third lens element 430, a fourth lens element 440, a fifth lens element 450, a sixth lens element 460, an IR-bandstop filter 470, an image plane 480, and an image sensing device 490.

The first lens element 410 has positive refractive power and it is made of plastic material. The first lens element 410 has a convex object-side surface 412 and a convex image-side surface 414, both of the object-side surface 412 and the image-side surface 414 are aspheric, and the object-side surface 412 has an inflection point.

The second lens element 420 has negative refractive power and it is made of plastic material. The second lens element 420 has a concave object-side surface 422 and a convex image-side surface 424, and both of the object-side surface 422 and the image-side surface 424 are aspheric.

The third lens element 430 has positive refractive power and it is made of plastic material. The third lens element 430 has a convex object-side surface 432 and a convex image-side surface 434, both of the object-side surface 432 and the image-side surface 434 are aspheric, and the object-side surface 432 has an inflection point.

The fourth lens element 440 has negative refractive power and it is made of plastic material. The fourth lens element 440 has a convex object-side surface 442 and a concave image-side surface 444, both of the object-side surface 442 and the image-side surface 444 are aspheric, and the object-side surface 442 has an inflection point.

The fifth lens element 450 has positive refractive power and it is made of plastic material. The fifth lens element 450 has a concave object-side surface 452 and a convex image-side surface 454, both of the object-side surface 452 and the image-side surface 454 are aspheric, the object-side surface 452 has two inflection points and the image-side surface 454 has an inflection point.

The sixth lens element 460 has negative refractive power and it is made of plastic material. The sixth lens element 460 has a convex object-side surface 462 and a concave image-side surface 464, both of the object-side surface 462 and the image-side surface 464 are aspheric, and the object-side surface 462 has two inflection points.

The IR-bandstop filter 470 is made of glass material without affecting the focal length of the optical image capturing system and it is disposed between the sixth lens element 460 and the image plane 480.

In the fourth embodiment of the optical image capturing system, focal lengths of the second lens element 420, the third lens element 430, the fourth lens element 440, and the fifth lens element 450 are f2, f3, f4, and f5, respectively. The following relation is satisfied: |f2|+|f3|+|f4|+|f5|=109.8411, |f1|+|f6|=5.2789 and |f2|+|f3|+|f4|+|f5|>|f1|+|f6|.

In the fourth embodiment of the optical image capturing system, a central thickness of the fifth lens element 450 on the optical axis is TP5. A central thickness of the sixth lens element 460 on the optical axis is TP6. The following relation is satisfied: TP5=0.493445 mm and TP6=0.3 mm.

In the fourth embodiment of the optical image capturing system, the first lens element 410, the fourth lens element 440 and the fifth lens element 450 are positive lens elements, and focal lengths of the first lens element 410, the fourth lens element 440 and the fifth lens element 450 are f1, f4, and f5, respectively. A sum of focal lengths of all lens elements with positive refractive power is ΣPP. The following relation is satisfied: ΣPP=f1+f4+f5=9.2847 mm and f1/(f1+f4+f5)=0.4123. Hereby, it's favorable for allocating the positive refractive power of the first lens element 410 to others positive lens elements and the significant aberrations generated in the process of moving the incident light can be suppressed.

In the fourth embodiment of the optical image capturing system, focal lengths of the second lens element 420, the third lens element 430 and the sixth lens element 460 are f2, f3 and f6, respectively. A sum of focal lengths of all lens elements with negative refractive power is ΣNP. The following relation is satisfied: ΣNP=f2+f3+f6=−105.1241 mm and f6/(f2+f3+f6)=0.0136. Hereby, it's favorable for allocating the negative refractive power of the sixth lens element 460 to others concave lens elements.

In the fourth embodiment of the optical image capturing system, a distance perpendicular to the optical axis between a critical point on the object-side surface 462 of the sixth lens element and the optical axis is HVT61. A distance perpendicular to the optical axis between a critical point on the image-side surface 464 of the sixth lens element and the optical axis is HVT62. The following relation is satisfied: HVT61=0.8549, HVT62=1.59 and HVT61/HVT62=0.5377.

Please refer to the following Table 7 and Table 8.

The detailed data of the optical image capturing system of the fourth embodiment is as shown in Table 7.

TABLE 7

Data of the optical image capturing system
f = 3.4134 mm; f/HEP = 2.4; HAF = 35 deg

| Surface # | Curvature Radius | | Thickness | Material | Index | Abbe # | Focal length |
|---|---|---|---|---|---|---|---|
| 0 | Object | Plano | Plano | | | | |
| 1 | Ape. stop | Plano | −0.06766 | | | | |
| 2 | Lens 1 | 3.04878 | 0.487318 | Plastic | 1.565 | 58 | 3.84 |
| 3 | | −7.09009 | 0.709991 | | | | |
| 4 | Lens 2 | −1.43163 | 0.3 | Plastic | 1.64 | 23.3 | −4.183 |
| 5 | | −3.32912 | 0.200897 | | | | |
| 6 | Lens 3 | 8.38244 | 0.67283 | Plastic | 1.565 | 58 | 3.612 |
| 7 | | −2.61902 | 0.056493 | | | | |
| 8 | Lens 4 | 11.54583 | 0.3 | Plastic | 1.607 | 26.6 | −100.185 |
| 9 | | 9.60829 | 0.248238 | | | | |
| 10 | Lens 5 | −10.4681 | 0.493445 | Plastic | 1.565 | 58 | 1.862 |
| 11 | | −0.9722 | 0.05 | | | | |
| 12 | Lens 6 | 3.17256 | 0.3 | Plastic | 1.543 | 56.5 | −1.439 |
| 13 | | 0.60603 | 0.8 | | | | |
| 14 | IR-bandstop filter | Plano | 0.2 | | 1.517 | 64.2 | |
| 15 | | Plano | 0.250324 | | | | |
| 16 | Image plate | Plano | −0.00015 | | | | |

Reference wavelength (d-line) = 587.5 nm

As for the parameters of the aspheric surfaces of the fourth embodiment, reference is made to Table 8.

TABLE 8

Aspheric Coefficients

| | Surface # | | | | | |
|---|---|---|---|---|---|---|
| | 2 | 3 | 4 | 5 | 6 | 7 |
| k = | −3.55465 | 50 | −0.068329 | 2.812943 | −35.928756 | 0.05331 |
| A4 = | −2.04744E−02 | −4.06834E−02 | 1.62586E−02 | −1.11566E−02 | −1.27474E−02 | 1.25566E−02 |
| A6 = | −5.34600E−02 | −4.42694E−02 | −3.97672E−02 | −1.43040E−02 | 2.68891E−04 | 2.02323E−03 |
| A8 = | 4.02998E−02 | 1.90593E−02 | 7.47414E−03 | −3.64371E−03 | −2.21446E−04 | 7.52816E−04 |
| A10 = | −9.01545E−02 | −4.06761E−02 | −7.98339E−03 | −2.84756E−04 | −5.21893E−04 | 1.10139E−04 |
| A12 = | | | | | | |
| A14 = | | | | | | |

TABLE 8-continued

Aspheric Coefficients

| Surface # | | | | | |
|---|---|---|---|---|---|
| 8 | 9 | 10 | 11 | 12 | 13 |
| k = 29.119805 | 12.574354 | −40.782353 | −9.486269 | −34.69517 | −4.526706 |
| A4 = −8.28540E−03 | −2.85222E−03 | 1.67498E−02 | 2.52940E−02 | −6.47119E−02 | −4.80206E−02 |
| A6 = −6.60797E−04 | −2.54574E−03 | 2.27977E−03 | 5.37769E−03 | 4.31205E−03 | 7.52866E−03 |
| A8 = −1.19166E−03 | 5.23081E−04 | −1.11486E−04 | 8.29631E−05 | 1.54920E−03 | −8.72562E−04 |
| A10 = −1.52470E−04 | 2.09055E−04 | 1.98180E−05 | −1.66151E−04 | 2.69482E−04 | −6.75179E−05 |
| A12 = | | −4.72916E−05 | −2.44940E−05 | 5.12503E−07 | 1.84160E−06 |
| A14 = | | −6.20378E−06 | −1.90298E−06 | −1.55201E−05 | 1.85082E−06 |

The presentation of the aspheric surface formula in the fourth embodiment is similar to that in the first embodiment. Besides the definitions of parameters in following tables are equal to those in the first embodiment so the repetitious details need not be given here.

The following content may be deduced from Table 7 and Table 8.

| Fourth embodiment (Primary reference wavelength: 555 mm) | | | |
|---|---|---|---|
| |TDT| | 4.5213% | InRS61 | −0.0914 |
| |ODT| | 2.5236% | InRS62 | 0.0422 |
| ΣPP | 9.2847 | |InRS61|/TP6 | 0.3047 |
| ΣNP | −105.1241 | |InRS62|/TP6 | 0.1407 |
| f1/ΣPP | 0.4123 | |f/f1| | 0.8908 |
| f6/ΣNP | 0.0136 | |f/f2| | 0.8213 |
| IN12/f | 0.2082 | |f/f3| | 0.9471 |
| HOS/f | 1.4861 | |f/f4| | 0.0343 |
| HOS | 5.0677 | |f/f5| | 1.8372 |
| InTL | 3.8192 | |f/f6| | 2.3774 |
| HOS/HOI | 2.0707 | (TP1 + IN12)/TP2 | 3.9910 |
| InS/HOS | 0.9866 | (TP6 + IN56)/TP5 | 0.7093 |
| InTL/HOS | 0.7536 | (TP2 + TP3 + TP4)/ΣTP | 0.5742 |
| ΣTP/InTL | 0.6686 | | |

The following content may be deduced from Table 7 and Table 8.

| Related inflection point values of fourth embodiment (Primary reference wavelength: 555 nm) | | | | | | |
|---|---|---|---|---|---|---|
| HIF111 | 0.58228 | HIF111/HOI | 0.2379 | SGI111 | 0.05006 | |SGI111|/(|SGI111| + TP1) | 0.0932 |
| HIF311 | 0.72696 | HIF311/HOI | 0.2970 | SGI311 | 0.02613 | |SGI311|/(|SGI311| + TP3) | 0.0374 |
| HIF411 | 0.85578 | HIF411/HOI | 0.3497 | SGI411 | 0.02807 | |SGI411|/(|SGI411| + TP4) | 0.0856 |
| HIF511 | 0.59566 | HIF511/HOI | 0.2434 | SGI511 | −0.01423 | |SGI511|/(|SGI511| + TP5) | 0.0280 |
| HIF512 | 1.57645 | HIF512/HOI | 0.6442 | SGI512 | 0.02151 | |SGI512|/(|SGI512| + TP5) | 0.0418 |
| HIF521 | 0.58746 | HIF521/HOI | 0.2400 | SGI521 | −0.11414 | |SGI521|/(|SGI521| + TP5) | 0.1879 |
| HIF611 | 0.44397 | HIF611/HOI | 0.1814 | SGI611 | 0.02467 | |SGI611|/(|SGI611| + TP6) | 0.0760 |
| HIF612 | 1.45240 | HIF612/HOI | 0.5935 | SGI612 | −0.03521 | |SGI612|/(|SGI612| + TP6) | 0.1050 |

The Fifth Embodiment (Embodiment 5)

Figure 5A:
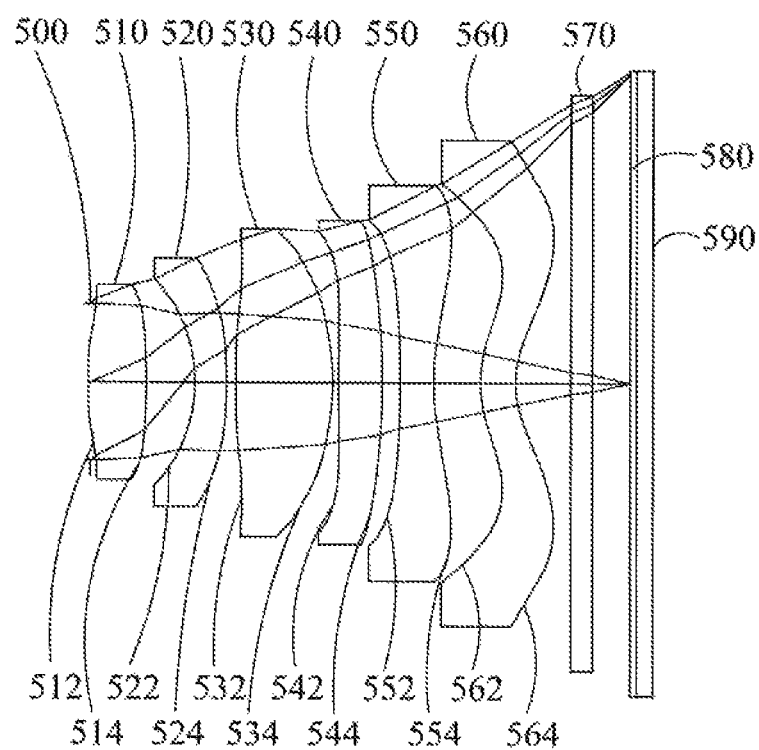
FIG. 5A is a schematic view of the optical image capturing system according to the fifth embodiment of the present application.
Figure 5B:
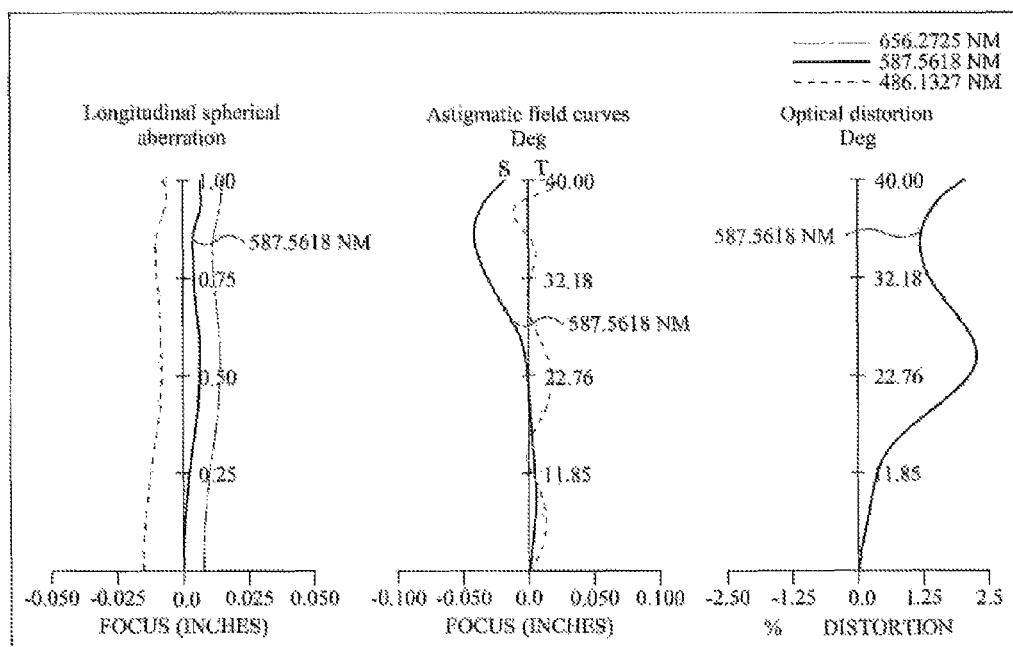
FIG. 5B is longitudinal spherical aberration curves, astigmatic field curves, and an optical distortion grid of the optical image capturing system in the order from left to right according to the fifth embodiment of the present application.
Figure 5C:
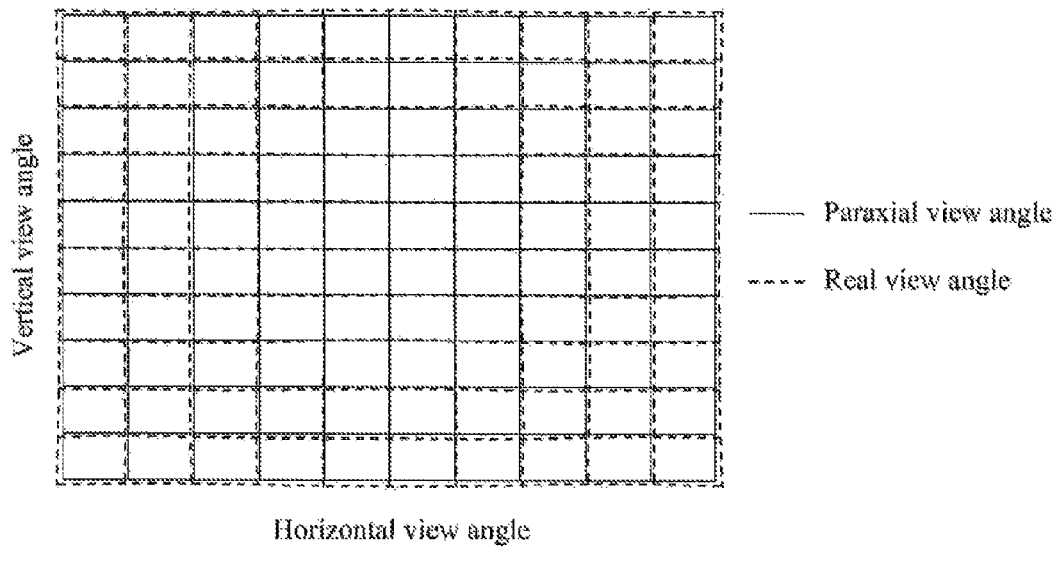
FIG. 5C is a TV distortion grid of the optical image capturing system according to the fifth embodiment of the present application.

Please refer to FIG. SA, FIG. 5B, and FIG. 5C, FIG. SA is a schematic view of the optical image capturing system according to the fifths embodiment of the present application, FIG. SB is longitudinal spherical aberration curves, astigmatic field curves, and an optical distortion curve of the optical image capturing system in the order from left to right according to the fifth embodiment of the present application, and FIG. 5C is a TV distortion grid of the optical image capturing system according to the fifth embodiment of the present application. As shown in FIG. 5A, in order from an object side to an image side, the optical image capturing system includes an aperture stop 500, first lens element 510, a second lens element 520, a third lens element 530, a fourth lens element 540, a fifth lens element 550, a sixth lens element 560, an IR-bandstop filter 570, an image plane 580, and an image sensing device 590.

The first lens element 510 has positive refractive power and it is made of plastic material. The first lens element 510 has a convex object-side surface 512 and a convex image-side surface 514, both of the object-side surface 512 and the image-side surface 514 are aspheric, and the object-side surface 512 has an inflection point.

The second lens element 520 has negative refractive power and it is made of plastic material. The second lens element 520 has a concave object-side surface 522 and a convex image-side surface 524, and both of the object-side surface 522 and the image-side surface 524 are aspheric.

The third lens element 530 has positive refractive power and it is made of plastic material. The third lens element 530 has a convex object-side surface 532 and a convex image-side surface 534, both of the object-side surface 532 and the image-side surface 534 are aspheric, and the object-side surface 532 has an inflection point.

The fourth lens element 540 has positive refractive power and it is made of plastic material. The fourth lens element 540 has a convex object-side surface 542 and a convex image-side surface 544, both of the object-side surface 542 and the image-side surface 544 are aspheric, and the object-side surface 542 has an inflection point.

The fifth lens element 550 has negative refractive power and it is made of plastic material. The fifth lens element 550 has a concave object-side surface 552 and a concave image-side surface 554, both of the object-side surface 552 and the image-side surface 554 are aspheric, and the image-side surface 554 has an inflection point.

The sixth lens element 560 has negative refractive power and it is made of plastic material. The sixth lens element 560 has a convex object-side surface 562 and a concave image-side surface 564, both of the object-side surface 562 and the image-side surface 564 are aspheric, the object-side surface 562 has an inflection point and the image-side surface 564 has three inflection points.

The IR-bandstop filter 570 is made of glass material without affecting the focal length of the optical image capturing system and it is disposed between the sixth lens element 560 and the image plane 580.

In the fifth embodiment of the optical image capturing system, focal lengths of the second lens element 520, the third lens element 530, the fourth lens element 540, and the fifth lens element 550 are f2, f3, f4, and f5, respectively. The following relation is satisfied: |f2|+|f3|+|f4|+|f5|=17.3055 and |f1|+|f6|=33.5277.

In the fifth embodiment of the optical image capturing system, a central thickness of the fifth lens element 550 on the optical axis is TP5. A central thickness of the sixth lens element 560 on the optical axis is TP6. The following relation is satisfied: TP5=0.302536 mm and TP6=0.323498 mm.

In the fifth embodiment of the optical image capturing system, the first lens element 510, the fourth lens element 540 and the fifth lens element 550 are positive lens elements, and focal lengths of the first lens element 510, the fourth lens element 540 and the fifth lens element 550 are f1, f4, and f5, respectively. A sum of focal lengths of all lens elements with positive refractive power is $\Sigma PP$. The following relation is satisfied: $\Sigma PP$=f1+f4+f5=13.2829 mm and f1/(f1+f4+f5)=0.2940. Hereby, it's favorable for allocating the positive refractive power of the first lens element 510 to others positive lens elements and the significant aberrations generated in the process of moving the incident light can be suppressed.

In the fifth embodiment of the optical image capturing system, focal lengths of the second lens element 520, the third lens element 530 and the sixth lens element 560 are f2, f3 and f6, respectively. A sum of focal lengths of all lens elements with negative refractive power is $\Sigma NP$. The following relation is satisfied: $\Sigma NP$=f2+f3+f=−37.5389 mm and f6/(f2+f3+f6)=0.7917. Hereby, it's favorable for allocating the negative refractive power of the sixth lens element 560 to others concave lens elements.

In the fifth embodiment of the optical image capturing system, a distance perpendicular to the optical axis between a critical point on the object-side surface 562 of the sixth lens element and the optical axis is HVT61. A distance perpendicular to the optical axis between a critical point on the image-side surface 564 of the sixth lens element and the optical axis is HVT62. The following relation is satisfied: HVT61=0.9768, HVT62=1.2955 and HVT61/HVT62=0.7540.

Please refer to the following Table 9 and Table 10.

The detailed data of the optical image capturing system of the fifth embodiment is as shown in Table 9.

TABLE 9

Data of the optical image capturing system
f = 3.3403 mm; f/HEP = 40; HAF = 40 deg

| Surface # | | Curvature Radius | Thickness | Material | Index | Abbe # | Focal length |
|---|---|---|---|---|---|---|---|
| 0 | Object | Plano | Plano | | | | |
| 1 | Ape. stop | Plano | −0.018905 | | | | |
| 2 | Lens 1 | 2.96221 | 0.529962 | Plastic | 1.565 | 58 | 3.918 |
| 3 | | −8.19113 | 0.439667 | | | | |
| 4 | Lens 2 | −1.50505 | 0.300076 | Plastic | 1.607 | 26.6 | −4.788 |
| 5 | | −3.35647 | 0.083039 | | | | |
| 6 | Lens 3 | 6.36714 | 0.882342 | Plastic | 1.565 | 54.5 | 3.232 |
| 7 | | −2.43248 | 0.05 | | | | |
| 8 | Lens 4 | 14.48953 | 0.40104 | Plastic | 1.64 | 23.3 | 6.203 |
| 9 | | −5.40903 | 0.159809 | | | | |
| 10 | Lens 5 | −10.91406 | 0.302536 | Plastic | 1.583 | 30.2 | −3.082 |
| 11 | | 2.1731 | 0.431192 | | | | |
| 12 | Lens 6 | 0.98792 | 0.323498 | Plastic | 1.583 | 30.2 | −29.61 |
| 13 | | 0.82175 | 0.5 | | | | |
| 14 | IR-bandstop filter | Plano | 0.2 | | 1.517 | 64.2 | |
| 15 | | Plano | 0.3427 | | | | |
| 16 | Image plate | Plano | 0.004317 | | | | |

Reference wavelength (d-line) = 587.5 nm

As for the parameters of the aspheric surfaces of the fifth embodiment, reference is made to Table 10.

TABLE 10

Aspheric Coefficients

| | Surface # | | | | | |
|---|---|---|---|---|---|---|
| | 2 | 3 | 4 | 5 | 6 | 7 |
| k = | −10.078024 | 43.256017 | −0.741971 | 5.87858 | −49.33192 | 0.285854 |
| A4 = | 1.08604E−02 | −5.99078E−02 | −4.39180E−02 | −3.80963E−02 | −1.22211E−02 | 3.23287E−03 |
| A6 = | −5.37485E−02 | −5.34163E−02 | −3.67877E−02 | 4.45606E−03 | −4.75489E−03 | −5.77639E−03 |

TABLE 10-continued

| Aspheric Coefficients | | | | | | |
|---|---|---|---|---|---|---|
| A8 = | 2.14646E−02 | −1.46816E−03 | −2.45473E−02 | 7.41722E−03 | 2.05495E−03 | −9.77101E−04 |
| A10 = | −7.94212E−02 | −4.56763E−02 | 2.91786E−03 | 2.08505E−03 | −1.27871E−03 | −2.65113E−04 |
| A12 = | | | | | | |
| A14 = | | | | | | |

| | Surface # | | | | | |
|---|---|---|---|---|---|---|
| | 8 | 9 | 10 | 11 | 12 | 13 |
| k = | −50 | 8.914852 | 49.898272 | −12.679754 | −3.536348 | −2.834883 |
| A4 = | −4.43512E−02 | 3.57826E−02 | −8.32535E−03 | −2.56425E−02 | −1.44792E−01 | −1.38147E−01 |
| A6 = | −5.58277E−03 | −1.23778E−02 | −1.84609E−03 | −1.64328E−03 | −4.28345E−03 | 3.86793E−02 |
| A8 = | −1.83119E−03 | 1.44361E−04 | −1.14545E−04 | 1.37468E−03 | 3.75075E−03 | −6.94452E−03 |
| A10 = | −7.70461E−04 | 5.90180E−04 | −1.83086E−04 | −8.77488E−05 | 1.06831E−03 | −2.24335E−04 |
| A12 = | | | −1.94659E−04 | −2.32604E−04 | −1.37776E−04 | 2.94885E−04 |
| A14 = | | | −8.10449E−05 | 3.19023E−05 | −2.76559E−05 | −2.89314E−05 |

The presentation of the aspheric surface formula in the fifth embodiment is similar to that in the first embodiment. Besides the definitions of parameters in following tables are equal to those in the first embodiment so the repetitious details need not be given here.

The following content may be deduced from Table 9 and Table 10.

| Fifth embodiment (Primary reference wavelength: 555 nm) | | | |
|---|---|---|---|
| \|TDT\| | 0.9462% | InRS61 | −0.4138 |
| \|ODT\| | 2.3482% | InRS62 | −0.0844 |
| ΣPP | 13.2829 | \|InRS61\|/TP6 | 1.2790 |
| ΣNP | −37.5389 | \|InRS62\|/TP6 | 0.2608 |
| f1/ΣPP | 0.2940 | \|f/f1\| | 0.8762 |
| f6/ΣNP | 0.7917 | \|f/f2\| | 0.7193 |
| IN12/f | 0.1285 | \|f/f3\| | 1.0622 |
| HOS/f | 1.4453 | \|f/f4\| | 0.5559 |
| HOS | 4.9459 | \|f/f5\| | 1.1169 |
| InTL | 3.9032 | \|f/f6\| | 0.1152 |
| HOS/HOI | 1.6831 | (TP1 + IN12)/TP2 | 3.2313 |
| InS/HOS | 0.9962 | (TP6 + IN56)/TP5 | 2.4945 |
| InTL/HOS | 0.7892 | (TP2 + TP3 + TP4)/ΣTP | 0.5789 |
| ΣTP/InTL | 0.7019 | | |

The following content may be deduced from Table 9 and Table 10.

| Related inflection point values of fifth embodiment (Primary reference wavelength: 555 nm) | | | | | | | |
|---|---|---|---|---|---|---|---|
| HIF111 | 0.59355 | HIF111/HOI | 0.2020 | SGI111 | 0.05375 | \|SGI111\|/(\|SGI111\| + TP1) | 0.0921 |
| HIF311 | 0.65619 | HIF311/HOI | 0.2233 | SGI311 | 0.02773 | \|SGI311\|/(\|SGI311\| + TP3) | 0.0305 |
| HIF411 | 0.34584 | HIF411/HOI | 0.1177 | SGI411 | 0.00345 | \|SGI411\|/(\|SGI411\| + TP4) | 0.0085 |
| HIF521 | 0.68057 | HIF521/HOI | 0.2316 | SGI521 | 0.08087 | \|SGI521\|/(\|SGI521\| + TP5) | 0.2109 |
| HIF611 | 0.51351 | HIF611/HOI | 0.1747 | SGI611 | 0.10602 | \|SGI611\|/(\|SGI611\| + TP6) | 0.2468 |
| HIF621 | 0.58799 | HIF621/HOI | 0.2001 | SGI621 | 0.16083 | \|SGI621\|/(\|SGI621\| + TP6) | 0.3321 |
| HIF622 | 1.96262 | HIF622/HOI | 0.6679 | SGI622 | 0.10972 | \|SGI622\|/(\|SGI622\| + TP6) | 0.2533 |
| HIF623 | 2.18090 | HIF623/HOI | 0.7422 | SGI623 | −0.01925 | \|SGI623\|/(\|SGI623\| + TP6) | 0.0562 |

The Sixth Embodiment (Embodiment 6)

Figure 6A:
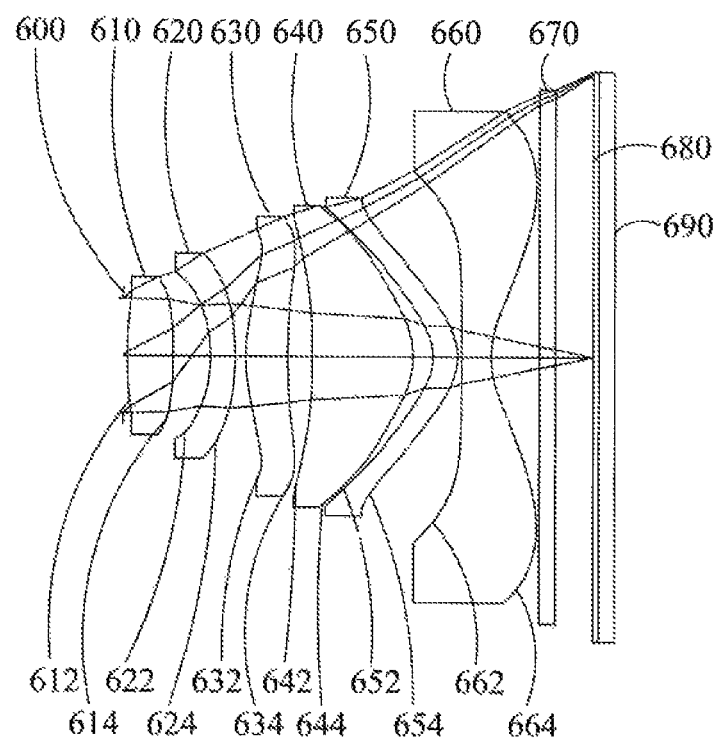
FIG. 6A is a schematic view of the optical image capturing system according to the sixth embodiment of the present application.
Figure 6B:
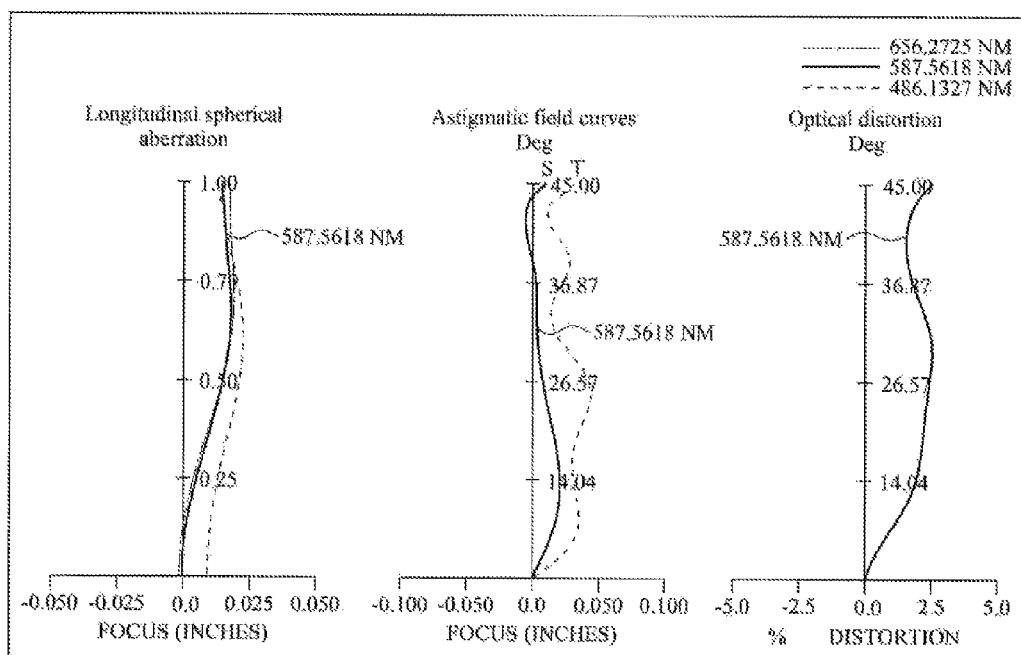
FIG. 6B is longitudinal spherical aberration curves, astigmatic field curves, and an optical distortion grid of the optical image capturing system in the order from left to right according to the sixth embodiment of the present application.
Figure 6C:
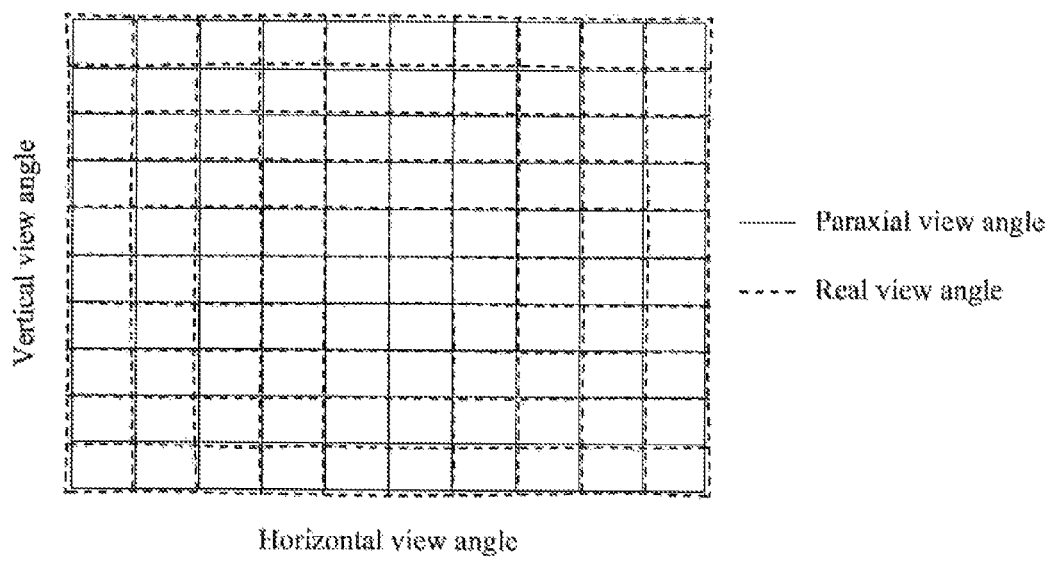
FIG. 6C is a TV distortion grid of the optical image capturing system according to the sixth embodiment of the present application.

Please refer to FIG. 6A, FIG. 6B, and FIG. 6C, FIG. 6A is a schematic view of the optical image capturing system according to the sixth embodiment of the present application, FIG. 6B is longitudinal spherical aberration curves, astigmatic field curves, and an optical distortion curve of the optical image capturing system in the order from left to right according to the sixth embodiment of the present application, and FIG. 6C is a TV distortion grid of the optical image capturing system according to the sixth embodiment of the present application. As shown in FIG. 6A, in order from an object side to an image side, the optical image capturing system includes an aperture stop 600, first lens element 610, a second lens element 620, a third lens element 630, a fourth lens element 640, a fifth lens element 650, a sixth lens element 660, an IR-bandstop filter 670, an image plane 680, and an image sensing device 690.

The first lens element 610 has positive refractive power and it is made of plastic material. The first lens element 610 has a convex object-side surface 612 and a convex image-side surface 614, both of the object-side surface 612 and the image-side surface 614 are aspheric, and the object-side surface 612 has an inflection point.

The second lens element 620 has negative refractive power and it is made of plastic material. The second lens element 620 has a concave object-side surface 622 and a convex image-side surface 624, and both of the object-side surface 622 and the image-side surface 624 are aspheric.

The third lens element 630 has positive refractive power and it is made of plastic material. The third lens element 630 has a convex object-side surface 632 and a concave image-side surface 634, both of the object-side surface 632 and the image-side surface 634 are aspheric, and each of the object-side surface 632 and the image-side surface 634 has an inflection point.

The fourth lens element 640 has positive refractive power and it is made of plastic material. The fourth lens element 640 has a concave object-side surface 642 and a convex image-side surface 644, and both of the object-side surface 642 and the image-side surface 644 are aspheric.

The fifth lens element 650 has positive refractive power and it is made of plastic material. The fifth lens element 650 has a concave object-side surface 652 and a convex image-side surface 654, both of the object-side surface 652 and the image-side surface 654 are aspheric, and the image-side surface 654 has an inflection point.

The sixth lens element 660 has negative refractive power and it is made of plastic material. The sixth lens element 660 has a convex object-side surface 662 and a concave image-side surface 664, both of the object-side surface 662 and the image-side surface 664 are aspheric, and the object-side surface 662 has two inflection points.

The IR-bandstop filter 670 is made of glass material without affecting the focal length of the optical image capturing system and it is disposed between the sixth lens element 660 and the image plane 680.

In the sixth embodiment of the optical image capturing system, focal lengths of the second lens element 620, the third lens element 630, the fourth lens element 640, and the fifth lens element 650 are f2, f3, f4, and f5, respectively. The following relation is satisfied: |f2|+|f3|+|f4|+|f5|=26.6938, |f1|+|f6|=6.537 and |f2|+|f3|+|f4|+|f5|>|f1|+|f6|.

In the sixth embodiment of the optical image capturing system, a central thickness of the fifth lens element 650 on the optical axis is TP5. A central thickness of the sixth lens element 660 on the optical axis is TP6. The following relation is satisfied: TP5=0.307007 mm and TP6=0.356193 mm.

In the sixth embodiment of the optical image capturing system, the first lens element 610, the fourth lens element 640 and the fifth lens element 650 are positive lens elements, and focal lengths of the first lens element 610, the fourth lens element 640 and the fifth lens element 650 are f1, f4, and f5, respectively. A sum of focal lengths of all lens elements with positive refractive power is ΣPP. The following relation is satisfied: ΣPP=f1+f4+f5=24.7900 mm and f1/(f1+f4+f5)=0.1948. Hereby, it's favorable for allocating the positive refractive power of the first lens element 610 to others positive lens elements and the significant aberrations generated in the process of moving the incident light can be suppressed.

In the sixth embodiment of the optical image capturing system, focal lengths of the second lens element 620, the third lens element 630 and the sixth lens element 660 are f2, f3 and f6, respectively. A sum of focal lengths of all lens elements with negative refractive power is ΣNP. The following relation is satisfied: ΣNP=f2+f3+f6=−8.1554 mm and f6/(f2+f3+f6)=0.2063. Hereby, it's favorable for allocating the negative refractive power of the sixth lens element 660 to others concave lens elements.

In the sixth embodiment of the optical image capturing system, a distance perpendicular to the optical axis between a critical point on the object-side surface 662 of the sixth lens element and the optical axis is HVT61. A distance perpendicular to the optical axis between a critical point on the image-side surface 664 of the sixth lens element and the optical axis is HVT62. The following relation is satisfied: HVT61=0.4928, HVT62=2.1156 and HVT61/HVT62=0.2329.

Please refer to the following Table 11 and Table 12.

The detailed data of the optical image capturing system of the sixth embodiment is as shown in Table 11.

TABLE 11

Data of the optical image capturing system
f = 3.4081 mm; f/HEP = 2.4; HAF = 45 deg

| Surface # | | Curvature Radius | Thickness | Material | Index | Abbe # | Focal length |
|---|---|---|---|---|---|---|---|
| 0 | Object | Plano | Plano | | | | |
| 1 | Ape. stop | Plano | 0.049075 | | | | |
| 2 | Lens 1 | 4.36709 | 0.565298 | Plastic | 1.54 | 59.7 | 4.843 |
| 3 | | −6.22459 | 0.455123 | | | | |
| 4 | Lens 2 | −1.67755 | 0.3 | Plastic | 1.64 | 23.3 | −6.52 |
| 5 | | −3.00113 | 0.131099 | | | | |
| 6 | Lens 3 | 2.54091 | 0.504638 | Plastic | 1.565 | 58 | 7.878 |
| 7 | | 5.49636 | 0.30522 | | | | |
| 8 | Lens 4 | −10.94147 | 1.236575 | Plastic | 1.565 | 58 | 1.581 |
| 9 | | −0.85934 | 0.242288 | | | | |
| 10 | Lens 5 | −0.60691 | 0.307007 | Plastic | 1.64 | 23.3 | 10.7.15 |
| 11 | | −0.66763 | 0.05 | | | | |
| 12 | Lens 6 | 128.77411 | 0.356193 | Plastic | 1.607 | 26.6 | −1.694 |
| 13 | | 1.01884 | 0.6 | | | | |
| 14 | IR-bandstop filter | Plano | 0.2 | | 1.517 | 64.2 | |
| 15 | | Plano | 0.452186 | | | | |
| 16 | Image plate | Plano | 0.015384 | | | | |

Reference wavelength (d-line) = 587.5 nm

As for the parameters of the aspheric surfaces of the sixth embodiment, reference is made to Table 12.

TABLE 12

Aspheric Coefficients

| Surface # | 2 | 3 | 4 | 5 | 6 | 7 |
|---|---|---|---|---|---|---|
| k = | −16.193093 | 34.187472 | 0.05653 | −0.050808 | −8.379665 | −4.334319 |
| A4 = | −7.16917E−03 | −4.37691E−02 | 4.61719E−02 | −6.60264E−03 | −7.65116E−03 | −1.20958E−02 |
| A6 = | −4.33570E−02 | −3.56209E−02 | −8.12050E−02 | −2.54330E−02 | −4.63733E−03 | −5.20560E−03 |
| A8 = | 2.88142E−02 | −4.59983E−04 | −3.26101E−03 | −9.79142E−04 | −1.66102E−03 | 1.31530E−04 |
| A10 = | −5.85885E−02 | −1.76737E−02 | −8.73214E−03 | 3.28157E−04 | −1.83018E−04 | −2.95570E−04 |
| A12 = | | | | | | |
| A14 = | | | | | | |

| Surface # | 8 | 9 | 10 | 11 | 12 | 13 |
|---|---|---|---|---|---|---|
| k = | 23.910169 | −3.794206 | −2.479933 | −2.15484 | −42.846816 | −4.643531 |
| A4 = | −2.94630E−02 | −1.58922E−02 | −7.24485E−03 | −4.53366E−03 | −5.68333E−03 | −2.51425E−02 |
| A6 = | 8.64431E−03 | −3.23671E−03 | −3.90547E−04 | 1.29055E−03 | −6.62824E−03 | 5.49868E−03 |
| A8 = | 7.74186E−04 | 1.01411E−04 | −1.15133E−03 | 3.84941E−05 | 9.24076E−04 | −1.11772E−03 |
| A10 = | −3.41519E−04 | 2.10481E−05 | 1.24894E−04 | 1.30298E−04 | −4.84652E−05 | 1.16324E−04 |
| A12 = | | | 1.07043E−05 | −1.13772E−05 | −1.16815E−05 | −5.98330E−06 |
| A14 = | | | 4.73847E−06 | 5.44197E−06 | 2.30432E−06 | 1.15439E−07 |

In the sixth embodiment, the presentation of the aspheric surface formula is similar to that in the first embodiment. Besides, the definitions of parameters in following tables are equal to those in the first embodiment, so the repetitious details need not be given here.

The following content may be deduced from Table 11 and Table 12 with the primary reference wavelength 555 nm.

| Sixth embodiment(Primary reference wavelength: 555 nm) | | | |
|---|---|---|---|
| |TDT| | 3.7181% | InRS61 | 0.3643 |
| |ODT| | 2.5014% | InRS62 | 0.0285 |
| ΣPP | 24.7900 | |InRS61|/TP6 | 1.0228 |
| ΣNP | −8.1554 | |InRS62|/TP6 | 0.0800 |
| f1/ΣPP | 0.1948 | |f/f1| | 0.7062 |
| f6/ΣNP | 0.2063 | |f/f2| | 0.5268 |
| IN12/f | 0.1335 | |f/f3| | 0.4343 |
| HOS/f | 1.6782 | |f/f4| | 2.1644 |
| HOS | 5.7226 | |f/f5| | 0.3237 |
| InTL | 4.4534 | |f/f6| | 2.0270 |
| HOS/HOI | 1.6337 | (TP1 + IN12)/TP2 | 3.4014 |
| InS/HOS | 1.0086 | (TP6 + IN56)/TP5 | 1.3231 |
| InTL/HOS | 0.7782 | (TP2 + TP3 + TP4)/ΣTP | 0.6264 |
| ΣTP/InTL | 0.7342 | | |

The following content may be deduced from Table 11 and Table 12.

| Related inflection point values of sixth embodiment (Primary reference wavelength: 555 nm) | | | | | | | |
|---|---|---|---|---|---|---|---|
| HIF111 | 0.56552 | HIF111/HOI | 0.1614 | SGI111 | 0.03249 | |SGI111|/(|SGI111| + TP1) | 0.0544 |
| HIF311 | 0.83134 | HIF311/HOI | 0.2373 | SGI311 | 0.11075 | |SGI311|/(|SGI311| + TP3) | 0.1800 |
| HIF321 | 0.80770 | HIF321/HOI | 0.2306 | SGI321 | 0.05171 | |SGI321|/(|SGI321| + TP3) | 0.0929 |
| HIF521 | 1.29371 | HIF521/HOI | 0.3693 | SGI521 | −0.76204 | |SGI521|/(|SGI521| + TP5) | 0.7128 |
| HIF611 | 0.30078 | HIF611/HOI | 0.0859 | SGI611 | 0.00030 | |SGI611|/(|SGI611| + TP6) | 0.0008 |
| HIF612 | 2.22103 | HIF612/HOI | 0.6341 | SGI612 | −0.51376 | |SGI612|/(|SGI612| + TP6) | 0.5906 |

The Seventh Embodiment (Embodiment 7)

Figure 7A:
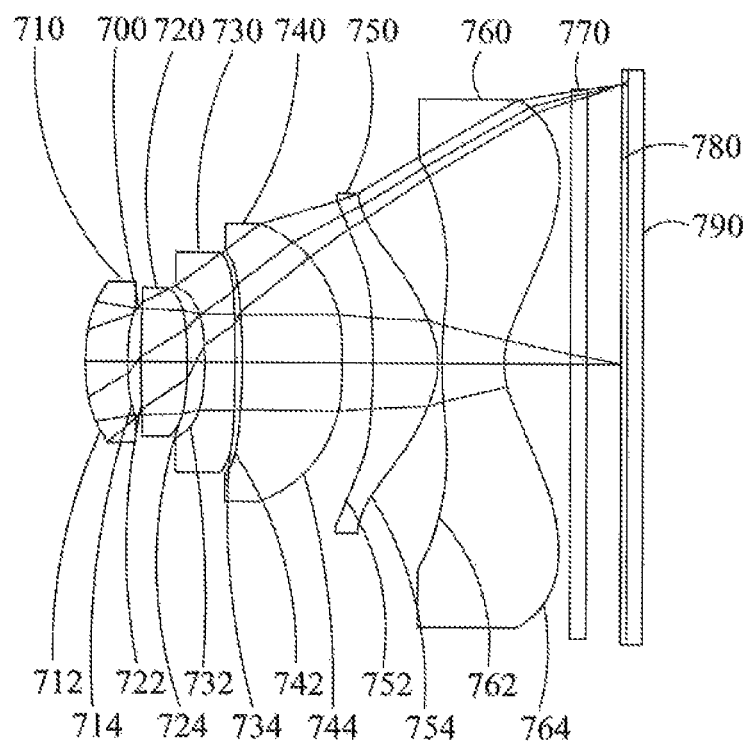
FIG. 7A is a schematic view of the optical image capturing system according to the seventh embodiment of the present application.
Figure 7B:
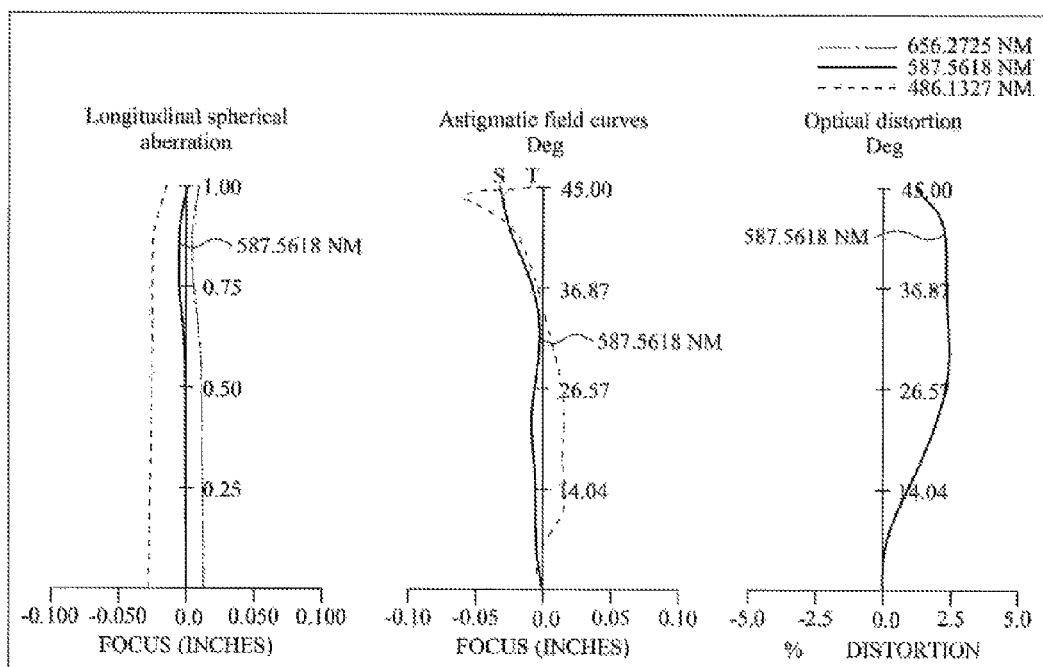
FIG. 7B is longitudinal spherical aberration curves, astigmatic field curves, and an optical distortion grid of the optical image capturing system in the order from left to right according to the seventh embodiment of the present application.
Figure 7C:
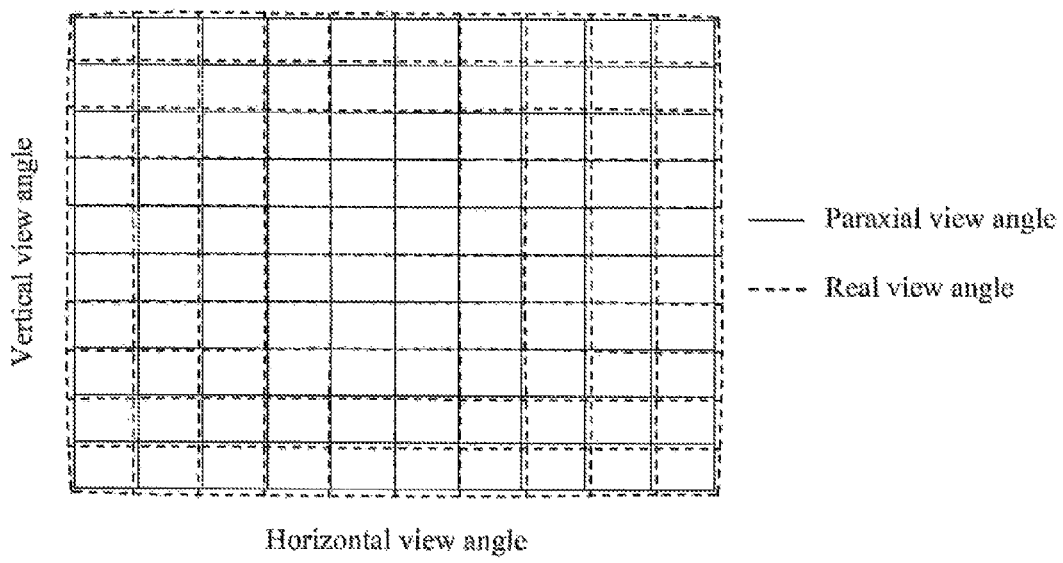
FIG. 7C is a TV distortion grid of the optical image capturing system according to the seventh embodiment of the present application.

Please refer to FIG. 7A, FIG. 7B, and FIG. 7C, FIG. 7A is a schematic view of the optical image capturing system according to the seventh embodiment of the present application, FIG. 7B is longitudinal spherical aberration curves, astigmatic field curves, and an optical distortion curve of the optical image capturing system in the order from left to right according to the seventh embodiment of the present application, and FIG. 7C is a TV distortion grid of the optical image capturing system according to the seventh embodiment of the present application. As shown in FIG. 7A, in order from an object side to an image side, the optical image capturing system includes an aperture stop 700, first lens element 710, a second lens element 720, a third lens element 730, a fourth lens element 740, a fifth lens element 750, a sixth lens element 760, an IR-bandstop filter 770, an image plane 780, and an image sensing device 790.

The first lens element 710 has positive refractive power and it is made of plastic material. The first lens element 710 has a convex object-side surface 712 and a concave image-side surface 714, and both of the object-side surface 712 and the image-side surface 714 are aspheric.

The second lens element 720 has positive refractive power and it is made of plastic material. The second lens element 720 has a convex object-side surface 722 and a convex image-side surface 724, and both of the object-side surface 722 and the image-side surface 724 are aspheric.

The third lens element 730 has negative refractive power and it is made of plastic material. The third lens element 730 has a concave object-side surface 732 and a convex image-side surface 734, and both of the object-side surface 732 and the image-side surface 734 are aspheric.

The fourth lens element 740 has positive refractive power and it is made of plastic material. The fourth lens element 740 has a concave object-side surface 742 and a convex image-side surface 744, and both of the object-side surface 742 and the image-side surface 744 are aspheric.

The fifth lens element 750 has positive refractive power and it is made of plastic material. The fifth lens element 750 has a concave object-side surface 752 and a convex image-side surface 754, both of the object-side surface 752 and the image-side surface 754 are aspheric, the object-side surface 752 has two inflection points and the image-side surface 754 has an inflection point.

The sixth lens element 760 has negative refractive power and it is made of plastic material. The sixth lens element 760 has a convex object-side surface 762 and a concave image-side surface 764, both of the object-side surface 762 and the image-side surface 764 are aspheric, the object-side surface 762 has two inflection points and the image-side surface 764 has an inflection point.

The IR-bandstop filter 770 is made of glass material without affecting the focal length of the optical image capturing system and it is disposed between the sixth lens element 760 and the image plane 780.

In the seventh embodiment of the optical image capturing system, focal lengths of the second lens element 720, the third lens element 730, the fourth lens element 740, and the fifth lens element 750 are f2, f3, f4, and f5, respectively. The following relation is satisfied: $|f2|+|f3|+|f4|+|f_5|=28.4543$, $|f1|+|f6|=11.2371$ and $|f2|+|f3|+|f4|+|f5|>|f1|+|f6|$.

In the seventh embodiment of the optical image capturing system, a central thickness of the fifth lens element 750 on the optical axis is TP5. A central thickness of the sixth lens element 760 on the optical axis is TP6. The following relation is satisfied: TP5=0.781785 mm and TP6=0.742771 mm.

In the seventh embodiment of the optical image capturing system, the first lens element 710, the fourth lens element 740 and the fifth lens element 750 are positive lens elements, and focal lengths of the first lens element 710, the fourth lens element 740 and the fifth lens element 750 are f1, f4, and f5, respectively. A sum of focal lengths of all lens elements with positive refractive power is ΣPP. The following relation is satisfied: ΣPP=f1+f4+f5=30.8749 mm and f1/(f1+f4+f5)=0.2963. Hereby, it's favorable for allocating the positive refractive power of the first lens element 710 to others positive lens elements and the significant aberrations generated in the process of moving the incident light can be suppressed.

In the seventh embodiment of the optical image capturing system, focal lengths of the second lens element 720, the third lens element 730 and the sixth lens element 760 are f2, f3 and f6, respectively. A sum of focal lengths of all lens elements with negative refractive power is ΣNP. The following relation is satisfied: ΣNP=f2+f3+f6=−8.6278 mm and f6/(f2+f3+f)=0.2344. Hereby, it's favorable for allocating the negative refractive power of the sixth lens element 760 to others concave lens elements.

In the seventh embodiment of the optical image capturing system, a distance perpendicular to the optical axis between a critical point on the object-side surface 762 of the sixth lens element and the optical axis is HVT61. A distance perpendicular to the optical axis between a critical point on the image-side surface 764 of the sixth lens element and the optical axis is HVT62. The following relation is satisfied: HVT61=1.1455, HVT62=2.2512 and HVT61/HVT62=0.5088.

Please refer to the following Table 13 and Table 14.

The detailed data of the optical image capturing system of the seventh embodiment is as shown in Table 13.

TABLE 13

Data of the optical image capturing system
f = 3.4197 mm; f/HEP = 2.4; HAF = 44 deg

| Surface # | | Curvature Radius | Thickness | Material | Index | Abbe # | Focal length |
|---|---|---|---|---|---|---|---|
| 0 | Object | Plano | Plano | | | | |
| 1 | Lens 1 | 2.23432 | 0.513199 | Plastic | 1.583 | 30.2 | 9.2083 |
| 2 | | 3.50342 | 0.110201 | | | | |
| 3 | Ape. stop | Plano | 0.044887 | | | | |
| 4 | Lens 2 | 23.50347 | 0.551374 | Plastic | 1.53 | 55.8 | 8.6314 |
| 5 | | −5.63405 | 0.213386 | | | | |
| 6 | Lens 3 | −3.58109 | 0.366481 | Plastic | 1.64 | 23.3 | −6.6562 |
| 7 | | −23.3688 | 0.087352 | | | | |
| 8 | Lens 4 | −6.16082 | 1.196161 | Plastic | 1.565 | 58 | 11.1953 |
| 9 | | −3.33977 | 0.366372 | | | | |
| 10 | Lens 5 | −11.5528 | 0.781785 | Plastic | 1.565 | 58 | 1.9714 |
| 11 | | −1.04073 | 0.05 | | | | |
| 12 | Lens 6 | 6.05551 | 0.742771 | Plastic | 1.565 | 54.5 | −2.0288 |
| 13 | | 0.92116 | 0.8 | | | | |
| 14 | IR-bandstop filter | Plano | 0.2 | | 1.517 | 64.2 | |
| 15 | | Plano | 0.395191 | | | | |
| 16 | Image plate | Plano | −0.00017 | | | | |
| | | Plano | Plano | | | | |

Reference wavelength (d-line) = 587.5 nm

As for the parameters of the aspheric surfaces of the seventh embodiment, reference is made to Table 14.

TABLE 14

Aspheric Coefficients

| | Surface # | | | | | |
|---|---|---|---|---|---|---|
| | 1 | 2 | 4 | 5 | 6 | 7 |
| k = | 2.49131 | −10.345704 | 33.098625 | −12.410541 | −1.131371 | 50 |
| A4 = | 8.59106E−03 | 1.04091E−01 | 3.70761E−03 | −1.16308E−01 | −1.67518E−01 | −9.07454E−03 |
| A6 = | 1.20367E−02 | 7.74499E−02 | 1.73344E−02 | −6.68013E−02 | −8.23040E−02 | −1.54396E−02 |
| A8 = | −1.25382E−02 | −1.85107E−01 | −1.08809E−01 | −5.54356E−02 | −2.80179E−02 | 9.76584E−03 |
| A10 = | 8.67534E−03 | 3.92295E−01 | 1.99307E−01 | −4.76882E−02 | −1.42312E−01 | −7.24296E−03 |
| A12 = | | | | | | |
| A14 = | | | | | | |

| | Surface # | | | | | |
|---|---|---|---|---|---|---|
| | 8 | 9 | 10 | 11 | 12 | 13 |
| k = | −50 | −11.057917 | 31.798924 | −3.311421 | −50 | −4.057565 |
| A4 = | 2.43294E−03 | −7.81428E−02 | −3.77048E−02 | −4.28082E−02 | −1.61625E−02 | −1.92853E−02 |
| A6 = | −1.53774E−02 | −9.16372E−04 | 1.96088E−03 | 8.58970E−03 | −3.31467E−03 | 1.19620E−03 |
| A8 = | 1.26876E−02 | −1.32116E−03 | 6.18678E−04 | 5.79440E−04 | 1.31466E−03 | 1.57163E−04 |
| A10 = | −7.89194E−03 | −1.98095E−05 | 1.71311E−04 | 3.72054E−05 | −1.47245E−04 | −5.87689E−05 |
| A12 = | | | 8.79729E−05 | 7.67068E−07 | 2.92860E−06 | 5.87104E−06 |
| A14 = | | | −2.37936E−05 | −4.82594E−06 | 2.96632E−07 | −2.20312E−07 |

The presentation of the aspheric surface formula in the seventh embodiment is similar to that in the first embodiment. Besides the definitions of parameters in following tables are equal to those in the first embodiment so the repetitious details need not be given here.

The following content may be deduced from Table 13 and Table 14.

| Seventh embodiment (Primary reference wavelength: 555 nm) | | | |
|---|---|---|---|
| \|TDT\| | 7.4265% | InRS61 | 0.3132 |
| \|ODT\| | 4.9001% | InRS62 | −3.3176 |
| ΣPP | 30.8749 | \|InRS61\|/TP6 | 0.4217 |
| ΣNP | −8.6278 | \|InRS62\|/TP6 | 4.4665 |
| f1/ΣPP | 0.2963 | \|f/f1\| | 0.3727 |
| f6/ΣNP | 0.2344 | \|f/f2\| | 0.3964 |
| IN12/f | 0.0455 | \|f/f3\| | 0.5162 |
| HOS/f | 1.8824 | \|f/f4\| | 0.3056 |
| HOS | 6.4190 | \|f/f5\| | 1.7352 |
| InTL | 5.0240 | \|f/f6\| | 1.6862 |
| HOS/HOI | 1.8553 | (TP1 + IN12)/TP2 | 1.2120 |
| InS/HOS | 0.9029 | (TP6 + IN56)/TP5 | 1.0141 |
| InTL/HOS | 0.7827 | (TP2 + TP3 + TP4)/ΣTP | 0.5647 |
| ΣTP/InTL | 0.8264 | | |

The following content may be deduced from Table 13 and Table 14.

| Related inflection point values of seventh embodiment (Primary reference wavelength: 555 nm) | | | | | | | |
|---|---|---|---|---|---|---|---|
| HIF511 | 1.54489 | HIF511/HOI | 0.4465 | SGI511 | −0.27475 | \|SGI511\|/(\|SGI511\| + TP5) | 0.2600 |
| HIF512 | 1.83065 | HIF512/HOI | 0.5291 | SGI512 | −0.39182 | \|SGI512\|/(\|SGI512\| + TP5) | 0.3339 |
| HIF521 | 1.33364 | HIF521/HOI | 0.3855 | SGI521 | −0.61663 | \|SGI521\|/(\|SGI521\| + TP5) | 0.4409 |
| HIF611 | 0.62745 | HIF611/HOI | 0.1813 | SGI611 | 0.02641 | \|SGI611\|/(\|SGI611\| + TP6) | 0.0343 |
| HIF612 | 2.63588 | HIF612/HOI | 0.7618 | SGI612 | −0.37836 | \|SGI612\|/(\|SGI612\| + TP6) | 0.3375 |
| HIF621 | 0.86785 | HIF621/HOI | 0.2508 | SGI621 | 0.26893 | \|SGI621\|/(\|SGI621\| + TP6) | 0.2658 |

The Eighth Embodiment (Embodiment 8)

Figure 8A:
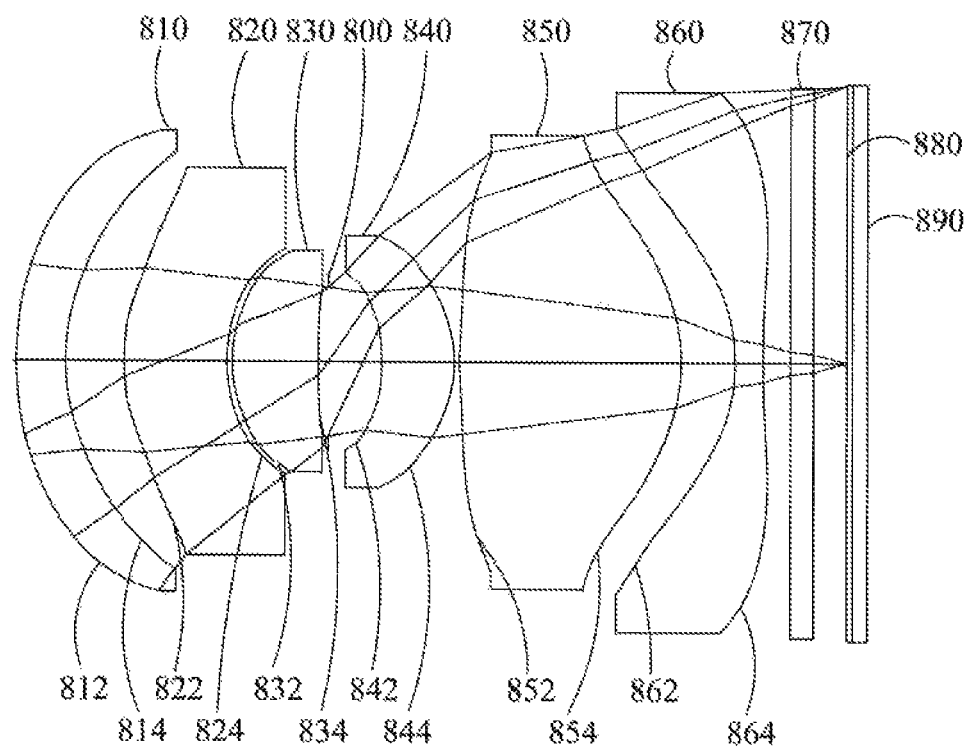
FIG. 8A is a schematic view of the optical image capturing system according to the eighth embodiment of the present application.
Figure 8B:
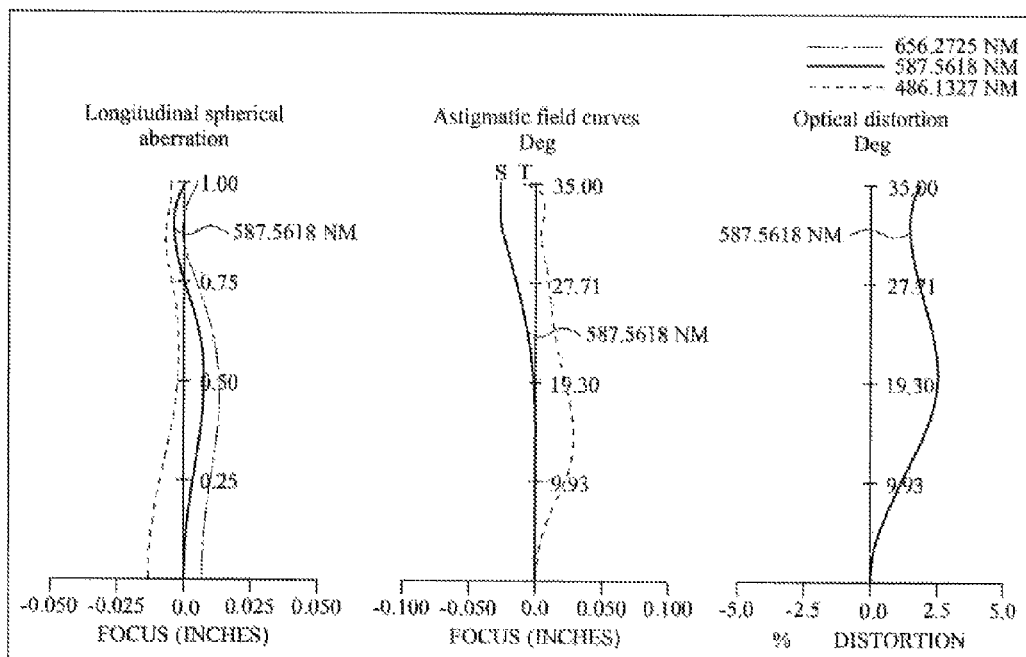
FIG. 8B is longitudinal spherical aberration curves, astigmatic field curves, and an optical distortion grid of the optical image capturing system in the order from left to right according to the eighth embodiment of the present application.
Figure 8C:
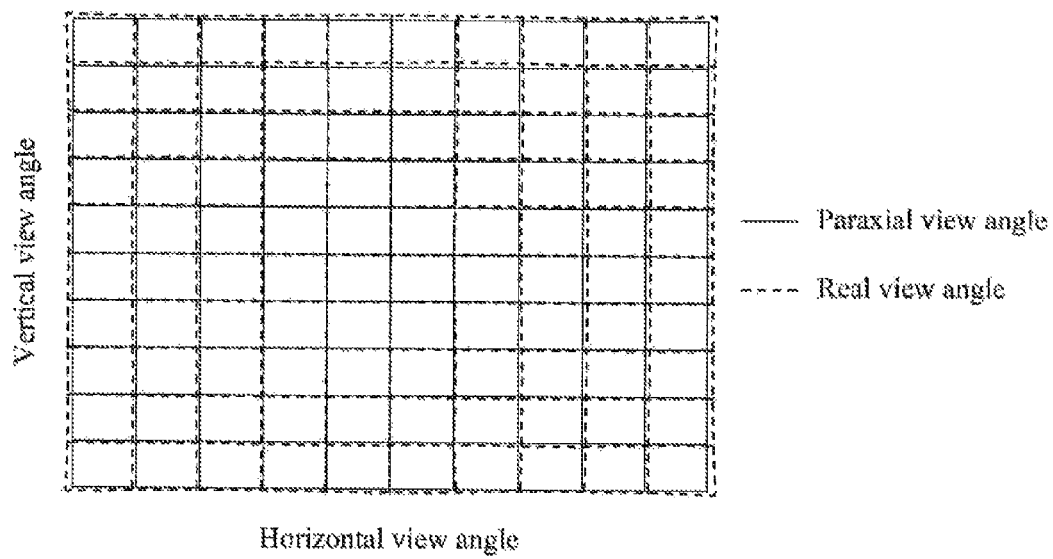
FIG. 8C is a TV distortion grid of the optical image capturing system according to the eighth embodiment of the present application.

Please refer to FIG. 8A, FIG. 8B, and FIG. 8C, FIG. 8A is a schematic view of the optical image capturing system according to the eighth embodiment of the present application, FIG. 8B is longitudinal spherical aberration curves, astigmatic field curves, and an optical distortion curve of the optical image capturing system in the order from left to right according to the eighth embodiment of the present application, and FIG. 8C is a TV distortion grid of the optical image capturing system according to the eighth embodiment of the present application. As shown in FIG. 8A, in order from an object side to an image side, the optical image capturing system includes an aperture stop 800, first lens element 810, a second lens element 820, a third lens element 830, a fourth lens element 840, a fifth lens element 850, a sixth lens element 860, an IR-bandstop filter 870, an image plane 880, and an image sensing device 890.

The first lens element 810 has negative refractive power and it is made of plastic material. The first lens element 810 has a convex object-side surface 812 and a concave image-side surface 814, and both of the object-side surface 812 and the image-side surface 814 are aspheric.

The second lens element 820 has negative refractive power and it is made of plastic material. The second lens element 820 has a convex object-side surface 822 and a concave image-side surface 824, and both of the object-side surface 822 and the image-side surface 824 are aspheric.

The third lens element 830 has positive refractive power and it is made of plastic material. The third lens element 830 has a convex object-side surface 832 and a concave image-side surface 834, both of the object-side surface 832 and the image-side surface 834 are aspheric, and the image-side surface 834 has an inflection point.

The fourth lens element 840 has positive refractive power and it is made of plastic material. The fourth lens element 840 has a concave object-side surface 842 and a convex image-side surface 844, and both of the object-side surface 842 and the image-side surface 844 are aspheric.

The fifth lens element 850 has positive refractive power and it is made of plastic material. The fifth lens element 850 has a convex object-side surface 852 and a convex image-side surface 854, and both of the object-side surface 852 and the image-side surface 854 are aspheric.

The sixth lens element 860 has negative refractive power and it is made of plastic material. The sixth lens element 860 has a concave object-side surface 862 and a concave image-side surface 864, and both of the object-side surface 862 and the image-side surface 864 are aspheric.

The IR-bandstop filter 870 is made of glass material without affecting the focal length of the optical image capturing system and it is disposed between the sixth lens element 860 and the image plane 880.

In the eighth embodiment of the optical image capturing system, focal lengths of the second lens element 820, the third lens element 830, the fourth lens element 840, and the fifth lens element 850 are f2, f3, f4, and f5, respectively. The following relation is satisfied: |f2|+|f3|+|f4|+|f5|=52.1863, |f1|+|f6|=11.6289 and |f2|+|f3|+|f4|+|f5|>|f1|+|f6|.

In the eighth embodiment of the optical image capturing system, a central thickness of the fifth lens element 850 on the optical axis is TP5. A central thickness of the sixth lens element 860 on the optical axis is TP6. The following relation is satisfied: TP5=1.92608 mm and TP6=0.237892 mm.

In the eighth embodiment of the optical image capturing system, the first lens element 810, the fourth lens element 840 and the fifth lens element 850 are positive lens elements, and focal lengths of the first lens element 810, the fourth lens element 840 and the fifth lens element 850 are f1, f4, and f5, respectively. A sum of focal lengths of all lens elements with positive refractive power is ΣPP. The following relation is satisfied: ΣPP=f1+f4+f5=12.4781 mm and f1/(f1+f4+f5)=0.2328. Hereby, it's favorable for allocating the positive refractive power of the first lens element 810 to others positive lens elements and the significant aberrations generated in the process of moving the incident light can be suppressed.

In the eighth embodiment of the optical image capturing system, focal lengths of the second lens element 820, the third lens element 830 and the sixth lens element 860 are f2, f3 and f6, respectively. A sum of focal lengths of all lens elements with negative refractive power is ΣNP. The following relation is satisfied: ΣNP=f2+f3+f5=−51.5945 mm and f6/(f2+f3+f6)=0.0395. Hereby, its favorable for allocating the negative refractive power of the sixth lens element 860 to others concave lens elements.

In the eighth embodiment of the optical image capturing system, a distance perpendicular to the optical axis between a critical point on the object-side surface 862 of the sixth lens element and the optical axis is HVT61. A distance perpendicular to the optical axis between a critical point on the image-side surface 864 of the sixth lens element and the optical axis is HVT62. The following relation is satisfied: HVT61=0, HVT62=1.0988 and HVT61/HVT62=0.

Please refer to the following Table 15 and Table 16.

The detailed data of the optical image capturing system of the eighth embodiment is as shown in Table 15.

TABLE 15

Data of the optical image capturing system
f = 3.41 mm; f/HEP = 2.0; HAF = 35 deg

| Surface # | | Curvature Radius | Thickness | Material | Index | Abbe # | Focal length |
|---|---|---|---|---|---|---|---|
| 0 | Object | Plano | Plano | | | | |
| 1 | Lens 1 | 3.00295 | 0.420497 | Plastic | 1.607 | 26.6 | −9.5765 |
| 2 | | 1.87533 | 0.511223 | | | | |
| 3 | Lens 2 | 1.79755 | 0.886934 | Plastic | 1.64 | 23.3 | −39.663 |
| 4 | | 1.35544 | 0.05 | | | | |
| 5 | Lens 3 | 1.40401 | 0.744021 | Plastic | 1.565 | 58 | 2.9139 |
| 6 | | 7.713 | 0.084074 | | | | |
| 7 | Ape. stop | Plano | 0.468038 | | | | |
| 8 | Lens 4 | −1.6021 | 0.622474 | Plastic | 1.565 | 58 | 7.0252 |
| 9 | | −1.3015 | 0.05 | | | | |
| 10 | Lens 5 | 11.89975 | 1.926079 | Plastic | 1.565 | 58 | 2.5842 |
| 11 | | −1.56705 | 0.468349 | | | | |
| 12 | Lens 6 | −1.56671 | 0.237892 | Plastic | 1.583 | 30.2 | −2.0524 |
| 13 | | 5.34744 | 0.243168 | | | | |
| 14 | IR-bandstop filter | Plano | 0.2 | | 1.517 | 64.2 | |
| 15 | | Plano | 0.286593 | | | | |
| 16 | Image plate | Plano | 0.000659 | | | | |

Reference wavelength (d-line) = 587.5 nm

As for the parameters of the aspheric surfaces of the eighth embodiment, reference is made to Table 16.

TABLE 16

Aspheric Coefficients

| Surface # | 1 | 2 | 3 | 4 | 5 | 6 |
|---|---|---|---|---|---|---|
| k = | 1.170689 | −0.755935 | −0.31221 | 0.674712 | 0.776053 | 9.136786 |
| A4 = | −1.06093E−03 | −1.64339E−02 | −4.37922E−02 | −5.33095E−02 | −9.94125E−03 | −2.11946E−03 |
| A6 = | 1.12026E−03 | 4.30502E−03 | −6.14891E−03 | 4.69365E−02 | 8.05170E−02 | −2.60130E−02 |
| A8 = | −1.55188E−04 | 3.04585E−04 | 2.12272E−03 | −5.28256E−03 | −1.60339E−02 | 7.12796E−03 |
| A10 = | 2.73449E−05 | −2.52914E−05 | −3.89716E−04 | −2.82012E−02 | −2.07123E−02 | −6.13917E−03 |
| A12 = | | | | | | |
| A14 = | | | | | | |

| Surface # | 8 | 9 | 10 | 11 | 12 | 13 |
|---|---|---|---|---|---|---|
| k = | 3.015501 | 0.259765 | −5.869012 | −1.532661 | −0.556401 | −21.298168 |
| A4 = | −4.35593E−02 | 2.48924E−02 | 1.40132E−02 | 8.60179E−03 | 3.44078E−03 | −3.46697E−02 |
| A6 = | −7.14757E−03 | −2.15956E−02 | −1.26884E−03 | −6.39645E−03 | 1.09159E−02 | 3.83764E−03 |
| A8 = | 6.06085E−02 | 3.80214E−02 | 1.25666E−04 | 1.71707E−03 | 1.60700E−04 | −2.21808E−04 |
| A10 = | −4.34538E−02 | −1.25439E−02 | 3.96348E−05 | 1.91249E−04 | −1.59080E−04 | −1.17270E−05 |
| A12 = | | | −2.85753E−06 | −3.88522E−06 | −1.93209E−05 | 8.76975E−07 |
| A14 = | | | −1.10366E−06 | −7.39802E−06 | 6.59872E−06 | −1.34669E−07 |

The presentation of the aspheric surface formula in the eighth embodiment is similar to that in the first embodiment. Besides, the definitions of parameters in following tables are equal to those in the first embodiment so the repetitious details need not be given here.

The following content may be deduced from Table 15 and Table 16.

| Eighth embodiment (Primary reference wavelength: 555 nm) | | | |
|---|---|---|---|
| \|TDT\| | 77.8805% | InRS61 | −0.0145 |
| \|ODT\| | 84.2363% | InRS62 | 0.0026 |
| ΣPP | 12.4781 | \|InRS61\|/TP6 | 0.0609 |
| ΣNP | −51.5945 | \|InRS62\|/TP6 | 0.0111 |
| f1/ΣPP | 0.2328 | \|f/f1\| | 0.3577 |
| f6/ΣNP | 0.0395 | \|f/f2\| | 0.0851 |
| IN12/f | 0.1501 | \|f/f3\| | 1.1723 |
| HOS/f | 2.1134 | \|f/f4\| | 0.4866 |
| HOS | 7.1963 | \|f/f5\| | 1.3216 |
| InTL | 6.4696 | \|f/f6\| | 1.6691 |
| HOS/HOI | 2.9600 | (TP1 + IN12)/TP2 | 1.0505 |
| InS/HOS | 0.6253 | (TP6 + IN56)/TP5 | 3.667 |
| InTL/HOS | 0.8990 | (TP2 + TP3 + TP4)/ΣTP | 0.6806 |
| ΣTP/InTL | 0.7478 | | |

The following content may be deducted from Table 15 and Table 16.

| Related inflection point values of eighth embodiment (Primary reference wavelength: 555 nm) | | | | | | | |
|---|---|---|---|---|---|---|---|
| HIF321 | 0.65938 | HIF321/HOI | 0.2712 | SGI321 | 0.02635 | \|SGI321\|/(\|SGI321\| + TP3) | 0.0342 |

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:
1. An optical image capturing system, from an object side to an image side, comprising:
a first lens element with positive refractive power;
a second lens element with refractive power;
a third lens element with refractive power;
a fourth lens element with refractive power;
a fifth lens element with refractive power;
a sixth lens element with refractive power; and
an image plane;
wherein the optical image capturing system comprises the six lens elements with refractive power and at least two lens elements among the six lens elements respectively have at least one inflection point on at least one surface thereof, at least one of the first through sixth lens elements has positive refractive power, an object-side surface and an image-side surface of the sixth lens element are aspheric, focal lengths of the first through sixth lens elements are f1, f2, f3, f4, f5, and f6, respectively, a focal length of the optical image capturing system is f, an entrance pupil diameter of the optical image capturing system is HEP, a distance from an object-side surface of the first lens element to the image plane is HOS, and the following relation is satisfied: $1.4 \leq f/HEP \leq 6.0$ and $0.5 \leq HOS/f \leq 3$, and wherein TV distortion for image formation in the optical image capturing system is TDT, optical distortion for image formation in the optical image capturing system is ODT, half of a view angle of the optical image capturing system is HAF, and the following relation is satisfied:

38 deg≤HAF≤70 deg, |TDT|≤60% and |ODT|≤50%.

2. The optical image capturing system of claim 1, wherein an image-side surface of the fifth lens element has at least one inflection point and the object-side surface of the sixth lens element has at least one inflection point.

3. The optical image capturing system of claim 1, wherein a distance perpendicular to the optical axis between the inflection point on the image-side surface or the object-side surface of the at least two of the six lens elements and the optical axis is HIF and the following relation is satisfied: 0.001 mm<HIF≤5 mm.

4. The optical image capturing system of claim 3, wherein a distance from the object-side surface of the first lens element to the image-side surface of the sixth lens element is InTL, a distance perpendicular to the optical axis between the inflection point on the image-side surface or the object-side surface of the at least two of the six lens elements and the optical axis is HIF, and the following relation is satisfied: 0<HIF/InTL≤0.9.

5. The optical image capturing system of claim 3, wherein an axial point on one of the object-side surface and the image-side surface of one of the at least two of the six lens elements is PI, a distance in parallel with the optical axis from the axial point PI to one of the inflection points on the one of the object-side surface and the image-side surface of one of the at least two of the six lens elements is SGI, and the following relation is satisfied: −2 mm≤SGI≤2 mm.

6. The optical image capturing system of claim 1, wherein the first lens element has positive refractive power, the fifth lens element has positive refractive power and the sixth lens element has negative refractive power.

7. The optical image capturing system of claim 1, wherein a distance from the object-side surface of the first lens element to the image-side surface of the sixth lens element is InTL and the following relation is satisfied: 0.6≤InTL/HOS≤0.9.

8. The optical image capturing system of claim 4, further comprising an aperture stop, wherein a distance from the aperture stop to the image plane on the optical axis is InS, an image sensing device is disposed on the image plane, half of a diagonal of an effective detection field of the image sensing device is HOI, and the following relation is satisfied: 0.6≤InS/HOS≤1.1 and 0≤HIF/HOI≤0.9.

9. An optical image capturing system, from an object side to an image side, comprising:
a first lens element with positive refractive power;
a second lens element with refractive power;
a third lens element with refractive power;
a fourth lens element with refractive power;
a fifth lens element with refractive power;
a sixth lens element with negative refractive power; and
an image plane;
wherein the optical image capturing system comprises the six lens elements with refractive power and at least two lens elements among the six lens elements respectively have at least one inflection point on at least one surface thereof, at least one of the second through fifth lens elements has positive refractive power, an object-side surface and an image-side surface of the sixth lens element are aspheric, focal lengths of the first through sixth lens elements are f1, f2, f3, f4, f5, and f6, respectively, a focal length of the optical image capturing system is f, an entrance pupil diameter of the optical image capturing system is HEP, a distance from an object-side surface of the first lens element to the image plane is HOS, TV distortion and optical distortion for image formation in the optical image capturing system is TDT and ODT, respectively, half of a view angle of the optical image capturing system is HAF, and the following relation is satisfied:

38 deg≤HAF≤70 deg, 1.4≤f/HEP≤6.0, 0.5≤HOS/f≤3.0, |TDT|<1.5%, and |ODT|≤2.5%.

10. The optical image capturing system of claim 9, wherein an image-side surface of the fifth lens element has at least one inflection point, and each of the object-side surface and the image-side surface of the sixth lens element has at least one inflection point.

11. The optical image capturing system of claim 9, wherein each of the object-side surface and the image-side surface of the sixth lens element has at least two inflection points.

12. The optical image capturing system of claim 9, wherein the following relation is satisfied: 0 mm<HOS≤20 mm.

13. The optical image capturing system of claim 9, wherein a distance from an object-side surface of the first lens element to the image-side surface of the sixth lens element on an optical axis is InTL and the following relation is satisfied: 0 mm<InTL≤18 mm.

14. The optical image capturing system of claim 9, wherein a total central thickness of all lens elements with refractive power on an optical axis is ΣTP and the following relation is satisfied: 0 mm<ΣTP≤10 mm.

15. The optical image capturing system of claim 9, wherein the image-side surface of the sixth lens element has an inflection point IF621 which is nearest to the optical axis, a distance in parallel with the optical axis from an axial point on the image-side surface of the sixth lens element to the inflection point IF621 is SGI621, a thickness of the sixth lens element on the optical axis is TP6, and the following relation is satisfied: 0≤SGI621/(TP6+SGI621)≤0.9.

16. The optical image capturing system of claim 9, wherein a distance from the first lens element to the second lens element on an optical axis is IN12, and the following relation is satisfied: 0<IN12/f≤0.3.

17. The optical image capturing system of claim 9, wherein half of a maximal view angle of the optical image capturing system is HAF and the following relation is satisfied: 0.4≤|tan(HAF)|≤3.0.

18. The optical image capturing system of claim 9, wherein the following relation is satisfied: 0.001≤|f/f1|≤1.5, 0.01≤|f/f2|≤0.9, 0.01≤|f/f3|≤1.5, 0.01≤|f/f4|≤5, 0.1≤|f/f5|≤5 and 0.1≤|f/f6|≤5.0.

19. An optical image capturing system, from an object side to an image side, comprising:
a first lens element with positive refractive power;
a second lens element with refractive power;
a third lens element with refractive power;
a fourth lens element with refractive power;
a fifth lens element with positive refractive power, and an image-side surface of the fifth lens element having at least one inflection point;
a sixth lens element with negative refractive power, and at least one of an object-side surface and an image-side surface of the sixth lens element having at least one inflection point; and
an image plane;

wherein the optical image capturing system has the six lens elements with refractive power, at least one of the first through fourth lens elements has at least one inflection point, focal lengths of the first through sixth lens elements are f1, f2, f3, f4, f5, and f6, respectively, a focal length of the optical image capturing system is f, an entrance pupil diameter of the optical image capturing system is HEP, a distance from an object-side surface of the first lens element to the image plane is HOS, TV distortion and optical distortion for image formation in the optical image capturing system is TDT and ODT, respectively, half of a view angle of the optical image capturing system is HAF, and the following relation is satisfied: 38 deg≤HAF≤70 deg, 1.4≤f/HEP≤3.0, 0.5≤HOS/f≤2.5, |TDT|<1.5%, and |ODT|≤2.5%.

20. The optical image capturing system of claim 19, a distance perpendicular to an optical axis between the inflection point of the at least two of the six lens elements and the optical axis is HIF, and the following relation is satisfied: 0.001 mm<HIF≤5 mm.

21. The optical image capturing system of claim 20, wherein a distance from the object-side surface of the first lens element to the image-side surface of the sixth lens element is InTL and the following relation is satisfied: 0.6≤InTL/HOS≤0.9.

22. The optical image capturing system of claim 19, wherein the following relation is satisfied: 0.01≤|f/f1|≤1.5 and 0.1≤|f/f6|≤5.0.

23. The optical image capturing system of claim 22, wherein a total central thickness of all lens elements with refractive power on an optical axis is ΣTP, a distance from the object-side surface of the first lens element to the image-side surface of the sixth lens element is InTL, and the following relation is satisfied: 0.45≤ΣTP/InTL≤0.95.

24. The optical image capturing system of claim 22, further comprising an aperture stop and an image sensing device disposed on the image plane, a distance from the aperture stop to the image plane is InS, and the following relation is satisfied: 0.6≤InS/HOS≤1.1.

* * * * *